United States Patent
Hamm et al.

(12)

(10) Patent No.: US 11,519,694 B1
(45) Date of Patent: Dec. 6, 2022

(54) SIGHT WITH ROTATABLE AIMING RING

(71) Applicant: H. H. & A. Sports, Inc., Wisconsin Rapids, WI (US)

(72) Inventors: Brian H. Hamm, Wisconsin Rapids, WI (US); Richard Robilotta, Lemont, IL (US)

(73) Assignee: H.H. & A. Sports, inc., Wisconsin Rapids, WI (US)

( * ) Notice: Subject to any disclaimer, the term of this patent is extended or adjusted under 35 U.S.C. 154(b) by 0 days.

(21) Appl. No.: 17/812,912

(22) Filed: Jul. 15, 2022

(51) Int. Cl.
*F41G 1/467* (2006.01)
*G02B 23/16* (2006.01)

(52) U.S. Cl.
CPC ............. *F41G 1/467* (2013.01); *G02B 23/16* (2013.01)

(58) Field of Classification Search
CPC ...................................................... F41G 1/467
See application file for complete search history.

(56) References Cited

U.S. PATENT DOCUMENTS

| | | |
|---|---|---|
| 656,867 A | 6/1900 | Toiman |
| 906,751 A | 12/1908 | Swasey |
| 1,330,002 A | 2/1920 | Price |
| 1,407,208 A | 2/1922 | Cassel |
| 1,451,584 A | 4/1923 | Mapes |
| 2,155,391 A | 4/1939 | Arden |
| 2,545,454 A | 3/1951 | Fredrickson |
| 2,671,966 A | 3/1954 | Jacobsen |
| 2,975,780 A | 3/1961 | Fisher |
| 2,980,897 A | 4/1961 | Rothgery |
| 3,108,584 A | 10/1963 | Coe |
| 3,224,427 A | 12/1965 | Ernest |
| 3,282,607 A | 11/1966 | Wolfe |
| 3,285,237 A | 11/1966 | Hoyl, Jr. |
| 3,342,173 A | 9/1967 | Ferguson |
| 3,455,027 A | 7/1969 | Perkins |
| 3,504,659 A | 4/1970 | Babington |
| 3,599,337 A | 8/1971 | Snodgrass |
| 3,618,586 A | 11/1971 | Current |
| 3,866,592 A | 2/1975 | Carella |
| 3,935,854 A | 2/1976 | Troncosco, Jr. |
| 4,071,014 A | 1/1978 | Trotter |
| 4,133,334 A | 1/1979 | Tone |
| 4,153,999 A | 5/1979 | O'Steen |
| 4,226,095 A | 10/1980 | Loken |
| 4,236,497 A | 12/1980 | Troncoso, Jr. |

(Continued)

FOREIGN PATENT DOCUMENTS

| | | |
|---|---|---|
| CN | 204686039 U | 9/2015 |
| EP | 07696790 | 4/1997 |

(Continued)

OTHER PUBLICATIONS

US 5,490,462 A, 02/1996, Savage (withdrawn)

(Continued)

*Primary Examiner* — Yaritza Guadalupe-McCall
(74) *Attorney, Agent, or Firm* — Thomas Lyneis; Godfrey & Kahn, S.C.

(57) ABSTRACT

A sight apparatus with a rotatable sight housing. The rotatable sight housing having a first sight pin and second sight pin. The sight housing is rotatable between a first position and second position to change between use of the first sight pin for a first target and second sight pin for a second target.

30 Claims, 19 Drawing Sheets

(56) References Cited

U.S. PATENT DOCUMENTS

| | | |
|---|---|---|
| 4,237,615 A | 12/1980 | Bracknell |
| 4,287,868 A | 9/1981 | Schiff |
| 4,291,664 A | 9/1981 | Nishioka |
| 4,318,390 A | 3/1982 | Trotter |
| 4,344,409 A | 8/1982 | Barner |
| 4,351,311 A | 9/1982 | Phares |
| 4,407,261 A | 10/1983 | Elliott |
| 4,452,222 A | 6/1984 | Quartino |
| 4,453,528 A | 6/1984 | Eckert |
| 4,473,058 A | 9/1984 | Terry |
| 4,492,214 A | 1/1985 | Kielhoffer |
| 4,528,973 A | 7/1985 | Rasmussen |
| 4,532,717 A | 8/1985 | Watson |
| 4,542,732 A | 9/1985 | Troncoso |
| 4,567,668 A | 2/1986 | King |
| 4,579,101 A | 4/1986 | Bateman, III |
| 4,598,688 A | 7/1986 | Paul |
| 4,608,959 A | 9/1986 | Seynaeve |
| 4,632,087 A | 12/1986 | Cline |
| 4,660,289 A | 4/1987 | Wilhide |
| 4,664,093 A | 5/1987 | Nunemaker |
| 4,676,220 A | 6/1987 | Pietraszek |
| 4,685,439 A | 8/1987 | Cosentino, Jr. |
| 4,686,956 A | 8/1987 | Troncoso, Jr. |
| 4,748,963 A | 6/1988 | Troncoso et al. |
| 4,748,964 A | 6/1988 | Troncoso, Jr. |
| 4,767,220 A | 8/1988 | Kamp |
| 4,796,597 A | 1/1989 | Farro |
| 4,803,971 A | 2/1989 | Fletcher |
| 4,809,670 A | 3/1989 | Simo |
| 4,827,895 A | 5/1989 | Troncoso, Jr. |
| 4,829,974 A | 5/1989 | Anderson |
| 4,838,237 A | 6/1989 | Cliburn |
| 4,865,007 A | 9/1989 | Saunders |
| 4,865,008 A | 9/1989 | Troncoso |
| 4,879,988 A | 11/1989 | Larson |
| 4,907,566 A | 3/1990 | Klein |
| 4,949,699 A | 8/1990 | Gerber |
| 4,953,521 A | 9/1990 | Troncoso et al. |
| 4,961,265 A | 10/1990 | Roberts |
| 5,009,215 A | 4/1991 | Ludwig |
| 5,031,601 A | 7/1991 | Gunter |
| 5,052,364 A | 10/1991 | Martin et al. |
| 5,062,407 A | 11/1991 | Newbold |
| 5,065,731 A | 11/1991 | Smith |
| 5,070,855 A | 12/1991 | Troncoso |
| 5,085,200 A | 2/1992 | Horton-Corcoran |
| 5,092,052 A | 3/1992 | Godsey |
| 5,092,053 A | 3/1992 | Roberts |
| 5,095,884 A | 3/1992 | Mertens |
| 5,117,604 A | 6/1992 | Jorloy |
| 5,117,803 A | 6/1992 | Johnson |
| 5,137,006 A | 8/1992 | Gallops |
| 5,144,937 A | 9/1992 | Colvin |
| 5,146,908 A | 9/1992 | Larson |
| 5,148,796 A | 9/1992 | Simo |
| 5,150,700 A | 9/1992 | Troncoso |
| 5,161,514 A | 11/1992 | Cary |
| 5,205,268 A | 4/1993 | Savage |
| 5,213,090 A | 5/1993 | Tone |
| 5,220,906 A | 6/1993 | Choma |
| D337,145 S | 7/1993 | Horton-Corcoran |
| 5,243,957 A | 9/1993 | Neilson |
| 5,249,565 A | 10/1993 | Saunders et al. |
| 5,251,606 A | 10/1993 | Colvin |
| 5,266,684 A | 11/1993 | Rutter et al. |
| 5,274,941 A | 1/1994 | Moore |
| 5,285,764 A | 2/1994 | Mertens |
| 5,327,877 A | 7/1994 | Shaw, III |
| 5,341,789 A | 8/1994 | Paglia |
| 5,359,984 A | 11/1994 | Simo |
| 5,365,912 A | 11/1994 | Pittman |
| 5,372,119 A | 12/1994 | Kidney |
| 5,394,858 A | 3/1995 | Karolian |
| 5,400,539 A | 3/1995 | Moore |
| 5,415,154 A | 5/1995 | Angeloni |
| 5,428,915 A | 7/1995 | King |
| 5,460,151 A | 10/1995 | Hamilton, Jr. |
| 5,460,152 A | 10/1995 | Specht |
| 5,465,491 A | 11/1995 | Thell |
| 5,490,263 A | 2/1996 | Hashemi |
| 5,503,136 A | 4/1996 | Tone |
| 5,511,317 A | 4/1996 | Allen |
| 5,522,375 A | 6/1996 | Simo |
| 5,526,799 A | 6/1996 | Simo |
| 5,529,048 A | 6/1996 | Antalosky |
| 5,553,597 A | 9/1996 | Sparks |
| 5,601,069 A | 2/1997 | Clark |
| 5,603,309 A | 2/1997 | Sheliga |
| 5,606,961 A | 3/1997 | Basik |
| 5,632,263 A | 5/1997 | Sartain |
| 5,651,185 A | 7/1997 | Vanderheyden |
| 5,697,356 A | 12/1997 | Chappell |
| 5,718,215 A | 2/1998 | Kenny |
| 5,722,381 A | 3/1998 | Mizek |
| 5,743,245 A | 4/1998 | Mizek |
| 5,896,849 A | 4/1999 | Branthwaite |
| 5,915,369 A | 6/1999 | Sheliga |
| 5,920,996 A | 7/1999 | Hurckman |
| 5,944,005 A | 8/1999 | Schiff |
| 5,960,779 A | 10/1999 | Jessee |
| 5,975,069 A | 11/1999 | Hamm |
| 6,035,842 A | 3/2000 | Bradley |
| 6,044,832 A | 4/2000 | Piersons, Jr. |
| 6,050,251 A | 4/2000 | Harwath et al. |
| 6,058,919 A | 5/2000 | Davis |
| 6,061,919 A | 5/2000 | Reichert |
| 6,073,351 A | 6/2000 | Barnett |
| 6,079,111 A | 6/2000 | Williams |
| 6,082,348 A | 7/2000 | Savage |
| 6,089,216 A | 7/2000 | Harwath et al. |
| 6,102,020 A | 8/2000 | Mizek |
| 6,161,532 A | 12/2000 | Goff |
| 6,178,958 B1 | 1/2001 | Gallops, Jr. |
| 6,178,959 B1 | 1/2001 | Troncoso, Jr. |
| 6,196,455 B1 | 3/2001 | Robinson |
| 6,202,635 B1 | 3/2001 | Evans |
| 6,502,566 B1 | 1/2003 | Achkar |
| RE38,096 E | 4/2003 | Branthwaite |
| 6,561,174 B1 | 5/2003 | Afshari |
| 6,571,785 B1 | 6/2003 | Choma |
| 6,591,538 B2 | 7/2003 | Holler |
| 6,595,195 B1 | 7/2003 | Barner |
| 6,598,333 B1 | 7/2003 | Randazzo |
| 6,609,306 B2 | 8/2003 | Johnson |
| 6,615,813 B1 | 9/2003 | Troncoso, Jr. |
| 6,634,349 B2 | 10/2003 | Mizek |
| 6,648,871 B2 | 11/2003 | Kusibojoska et al. |
| 6,651,355 B2 | 11/2003 | Byrd |
| 6,651,941 B1 | 11/2003 | Bower |
| 6,662,796 B2 | 12/2003 | Cyr |
| 6,681,754 B1 | 1/2004 | Angeloni |
| 6,684,871 B1 | 2/2004 | Troncoso et al. |
| 6,688,296 B1 | 2/2004 | Greywall |
| 6,739,321 B1 | 5/2004 | Puchlerz |
| 6,742,511 B1 | 6/2004 | Remme |
| 6,776,149 B1 | 8/2004 | Beeks |
| 6,782,881 B2 | 8/2004 | Mizek |
| 6,792,932 B2 | 8/2004 | Musacchia |
| 6,789,536 B1 | 9/2004 | Summers |
| 6,796,039 B2 | 9/2004 | Walbrink |
| 6,814,068 B1 | 11/2004 | Troncoso, Jr. |
| 6,823,597 B2 | 11/2004 | Larson |
| 6,823,856 B2 | 11/2004 | Rager |
| 6,839,994 B2 | 1/2005 | Proctor |
| 6,895,676 B1 | 5/2005 | Mendyk |
| 6,904,900 B2 | 6/2005 | Gallops |
| 6,913,008 B2 | 7/2005 | Simo |
| 6,915,791 B2 | 7/2005 | Harwath |
| 6,920,870 B2 | 7/2005 | Minica |
| 6,938,616 B2 | 9/2005 | Walk |
| 6,948,488 B2 | 9/2005 | Afshari |
| 7,100,591 B2 | 9/2006 | Terry |
| 7,121,037 B2 | 10/2006 | Penney |

(56) References Cited

U.S. PATENT DOCUMENTS

| | | |
|---|---|---|
| 7,140,143 B1 | 11/2006 | Ivey |
| 7,219,662 B1 | 5/2007 | Henry |
| 7,278,216 B2 | 10/2007 | Grace |
| 7,308,772 B1 | 12/2007 | Millett |
| 7,311,099 B2 | 12/2007 | Rager |
| 7,331,338 B2 | 2/2008 | Mizek |
| 7,360,313 B1 | 4/2008 | Hamm |
| 7,392,590 B2 * | 7/2008 | Gordon .................. F41G 1/467 124/87 |
| 7,409,950 B2 | 8/2008 | Ellig |
| 7,475,485 B1 | 1/2009 | Hamm |
| D589,578 S | 3/2009 | Choma |
| 7,520,083 B2 | 4/2009 | Dextraze |
| 7,597,095 B2 | 10/2009 | Grace |
| 7,634,990 B1 | 12/2009 | Gartland |
| 7,681,566 B2 | 3/2010 | Mertens |
| 7,717,103 B2 | 5/2010 | Johnson |
| 7,748,371 B1 | 7/2010 | Doty |
| 7,900,366 B2 | 3/2011 | Johnson |
| 7,963,279 B2 | 6/2011 | Harwath |
| 8,079,171 B2 | 12/2011 | Barrett |
| 8,240,075 B1 | 8/2012 | Mullin |
| 8,333,180 B2 | 12/2012 | Mizek |
| 8,434,464 B1 | 5/2013 | Terzo |
| 8,448,341 B2 * | 5/2013 | Haney .................. F41G 11/003 124/88 |
| 8,474,443 B2 | 7/2013 | Geno |
| 8,528,140 B1 | 9/2013 | Phillips |
| 8,544,457 B1 | 10/2013 | Munsell |
| 8,596,253 B2 | 12/2013 | Adams |
| 8,701,643 B2 | 4/2014 | Ellig |
| 8,707,606 B2 | 4/2014 | Hoel |
| 8,752,536 B2 | 6/2014 | Sims |
| 8,960,174 B2 | 2/2015 | Khoshnood |
| 8,967,131 B2 | 3/2015 | Hunt |
| 9,004,054 B2 | 4/2015 | Khoshnood |
| 9,032,944 B2 | 5/2015 | Adams |
| 9,089,248 B2 | 7/2015 | Liu |
| 9,151,567 B1 | 10/2015 | Estridge |
| 9,341,433 B1 | 5/2016 | Summers |
| 9,453,709 B2 | 9/2016 | Hamm |
| 9,726,453 B1 | 8/2017 | Hamm |
| 9,746,277 B2 | 8/2017 | Khoshnood |
| 9,816,778 B2 | 11/2017 | Ellig et al. |
| 9,909,839 B1 * | 3/2018 | Hamm ...................... F41G 1/41 |
| 9,933,229 B2 | 4/2018 | Coalson et al. |
| 10,036,612 B2 * | 7/2018 | Hamm .................. F41G 1/467 |
| 10,190,851 B1 * | 1/2019 | Hamm .................. F41G 1/467 |
| 10,443,983 B2 * | 10/2019 | Hamm .................. F41G 1/467 |
| 10,907,933 B1 * | 2/2021 | Hamm .................. F41G 1/467 |
| 2002/0100177 A1 | 8/2002 | Savage |
| 2003/0024516 A1 | 2/2003 | Mizek |
| 2003/0056379 A1 | 3/2003 | Johnson |
| 2005/0172945 A1 | 8/2005 | Rager |
| 2005/0188972 A1 | 9/2005 | Davis |
| 2006/0010759 A1 | 1/2006 | Penney |
| 2006/0137670 A1 | 6/2006 | Shaffer |
| 2006/0157038 A1 | 7/2006 | Ellig |
| 2006/0162709 A1 | 7/2006 | Roberts et al. |
| 2006/0179704 A1 | 8/2006 | Dextraze |
| 2006/0201005 A1 | 9/2006 | Lueck |
| 2006/0286433 A1 | 12/2006 | Rakowski et al. |
| 2007/0163560 A1 | 7/2007 | Mertens |
| 2008/0000463 A1 | 1/2008 | Holmberg |
| 2008/0163503 A1 | 7/2008 | Priebe |
| 2009/0307956 A1 | 12/2009 | Barret |
| 2010/0162611 A1 | 7/2010 | Samson |
| 2011/0168147 A1 | 7/2011 | Schaffer |
| 2011/0271944 A1 * | 11/2011 | Haney .................. F41B 5/1434 124/87 |
| 2012/0138035 A1 | 6/2012 | Ellig |
| 2012/0279107 A1 | 11/2012 | Hoel |
| 2013/0255654 A1 | 10/2013 | Nystrom |
| 2015/0075016 A1 | 3/2015 | Wassmer |
| 2015/0184972 A1 | 7/2015 | Grace et al. |
| 2016/0025456 A1 * | 1/2016 | Hamm ...................... F41G 1/41 33/263 |
| 2017/0191788 A1 | 7/2017 | Eacker |
| 2018/0045488 A1 | 2/2018 | Hamm |

FOREIGN PATENT DOCUMENTS

| | | |
|---|---|---|
| EP | 19960307576 | 4/1997 |
| GB | 191018847 | 8/1909 |
| WO | WO2007089579 | 8/2007 |

OTHER PUBLICATIONS http://www.hhasports.com/catalog/1/optimizer-lite-ultra/, website screenshot for the Optimizer Lite Ultra; Dec. 21, 2014.

http://www.hhasports.com/catalog/4/optimizer-lite/; website screenshot for the Optimizer Lite; Dec. 21, 2014.

http://www.hhasports.com/catalog/3/optimizer-lite-cadet/; website screenshot for the Optimizer Lite Cadet; Dec. 21, 2014.

http://www.hhasports.com/catalog/5/brushfire/; website screenshot for the Brushfire; Dec. 21, 2014.

http://www.hhasports.com/catalog/14/pro-series/; website screenshot for the Pro Series; Dec. 21, 2014.

Website screenshot of Bowlinger Archery Inc. Medusa Max arrow rest at facebook.com; Apr. 21, 2015.

Website screenshot of AAE D.O.A. arrow rest at facebook.com, Jun. 27, 2014.

Spot Hogg Catalog, 2011.

https://www.youtube.com/watch?v=jYPorUBPMow; YouTube video HHA Sports Optimizer Cadet Youth Archery Sight; captured Dec. 23, 2013.

HHA Sports 2002 Archery Product Catalog.

"Review: Limb Driver Arrow Rest"; archeryreport.com; Mar. 30, 2010; https://web.archive.org/web/20100330091317/http://archeryreport.com/2010/ 03/review-limb-driver-arrow-rest/.

"Gear Review—Trophy Taker Smackdown Pro Arrow Rest": Sole Adventure, soleadventure.com, Mar. 18, 2013; http://soleadventure.com/2013/03/gear-review-trophy-taken-smackdown-proarrow-rest/.

"UP*Draft Limb-Driven Drop-Away Arrow Rest": TruGlo, truglo.com, Dec. 20, 2017; https://web.archive.org/web/20171220115745/http://www.truglo.com:80/archery-rests/up-draft-limb-driven-drop-away-arrow-rest-asp.

"Guide To Compound Bow Arrow Rests"; P.J. Reilly, Lancaster Archer Supply. lancasterarchery.com, Jun. 2, 2017; http://www.lancasterarchery.com/blog/guide-to-compound-bow-arrow-rests/.

"The Modern Compound Bow", LokMan Sung et al., Journal of forensic sciences 63.1 (2018): 130-139; https://onlinelibrary.wiley.com/doi/pdf/10.111/1558-4029.13503.

"Harnskea Hybrid Hunter Pro Arrow Rest (Microtune)", Lancaster Archer Supply, lancasterarchery.com, accessed Jul. 18, 2017; http://www.lancasterarchery.com/harnskea-hybrid-hunter-pro-arrow-restmicrotune.

"Newest: AAE Pro Drop Rest: Limb or Cable Activated Fall-Away Rest"; bowhunting.net, Apr. 26, 2016; http://web.archive.org/web/20160923182309/http://www.bowhunting.net/2016/04/newest-aae-pro-drop-rest-limb-or-cable-activated-fall-away-rest/.

* cited by examiner

SIGHT WITH ROTATABLE AIMING RING

FIELD OF THE INVENTION

This invention relates generally to a sight for a firearm, bow or other similar type of weapon or equipment. More particularly, the present invention relates to a sight.

BRIEF DESCRIPTION OF THE DRAWINGS

Embodiments of the multi-purpose sight are disclosed with reference to the accompanying exemplary drawings, which are for illustrative purposes. It will be understood by those skilled in the art that one or more aspects of this invention can meet certain objectives, while one or more other aspects can lead to certain other objectives. Other objects, features, benefits and advantages of the present invention will be apparent in the summary and descriptions of the disclosed embodiment(s), and will be readily apparent to those skilled in the art. Such objects, features, benefits and advantages will be apparent from the above as taken in conjunction with the accompanying figures and all reasonable inferences to be drawn therefrom.

FIG. 9C is a front elevation view of the portion of the portion of the sight apparatus of FIG. 1 with the scope head pushed in.

DETAILED DESCRIPTION

Figure 1:
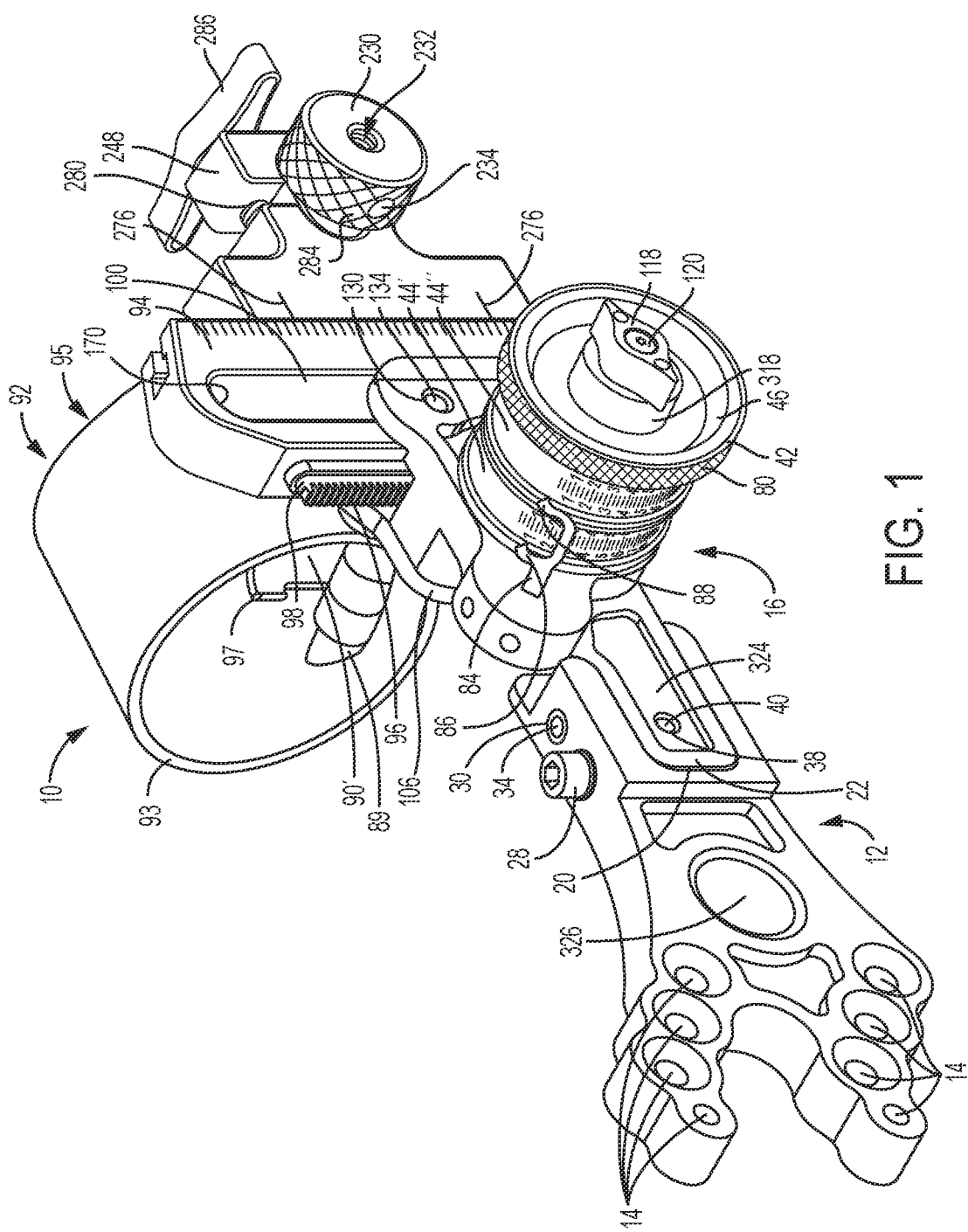
FIG. 1 is a perspective view of a sight apparatus.

The sight apparatus or sight 10, as shown in FIGS. 1-8, has a housing or frame configured to attach the sight to a bow, for example. The frame can include a number of members or portions, as seen in FIG. 2A. One portion of the frame as best seen in FIG. 1, is a mounting member or bracket 12 which has a variety of mounting holes 14 that permit the sight apparatus 10 to be attached to a variety of firearms, weapons or equipment, in this example a bow, in a variety of positions. Another portion of the frame shown in FIG. 2A is an adjustable member or portion 16 that is adjustably connected to the mounting member 12. The frame could also be integrally formed or any number of the portions combined or integrally formed, e.g. slide member, block, arm, etc.

In the embodiment shown in FIGS. 1-8, the sight apparatus 10 includes a number of correction mechanisms, designed to permit the sight apparatus to be adjusted in a number of ways such that the sight may be very finely calibrated. Some equipment may not need such fine calibration and therefore, may not need as many or any such correction mechanisms.

Figure 2A:
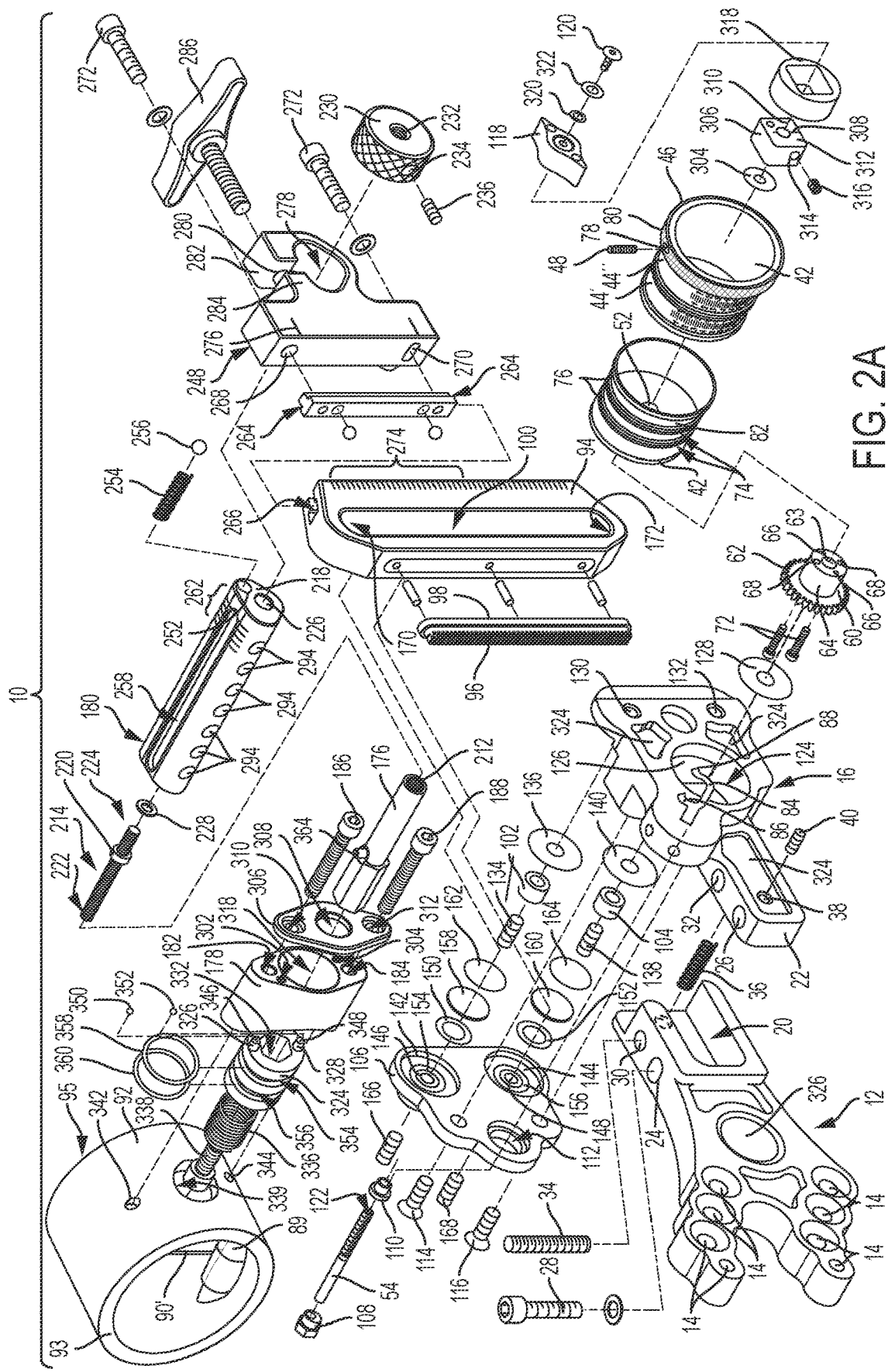
FIG. 2A is an exploded perspective view of the sight apparatus of FIG. 1.

For example, as seen in FIG. 2A, the mounting member 12 may have a cavity or aperture 20 sized and shaped to receive the end 22 of the adjustable member 16. The mounting member 12 has an elongated hole 24 that generally aligns with a threaded hole 26 in the adjustable member 16 to receive a fastener 28 when the end 22 of the adjustable member is received within the cavity 20. The mounting member has another hole 30 that aligns with a second hole 32 in the adjustable member 16 to receive a pin 34 when the end 22 of the adjustable member is received within the cavity 20. Between the end 22 of the adjustable member 16 and the mounting member 12 is a spring 36 to pull the adjustable member towards the mounting member when the fastener 28 is not fully tightened. The adjustable member 16 also has a threaded hole 38 in its side which receives a fastener 40, for example a threaded insert.

When the fastener 28 is not tightly secured, the mounting member 12, the adjustable member 16, and thereby the forward portions of the sight apparatus 10, can be adjusted with respect to the mounting member 12, and thereby the equipment to which the mounting member is mounted, e.g. a bow. The elongated hole 24 allows the adjustable member 16 to be rotated about the pin 34 because as the adjustable member is moved, the fastener 28 can move within the elongated hole. This allows the sight apparatus 10 to be adjusted based upon the equipment to which it is attached and to account for minor deviations in manufacturing and assembly.

For micro-adjustment, the fastener 28 can be loosened and the threaded insert 40 screwed further into the hole 38 until the threaded insert contacts the mounting member 12. As the threaded insert 40 is further screwed into the hole 38, the end 22 of the adjustable member 16 will be pushed further away from the mounting member 12, overcoming the force of the spring 36, to rotate the adjustable member and the forward portions of the sight apparatus 10 by very small and closely controlled amounts.

The adjustable member 16 also includes a cylindrical handle such as wheel or dial 42 that can have markings 44 such as minutes of angle, distances or any other indicia. For example, for a bow, the indicia could be specifically correlated to different factors, including, but not limited to distances for the draw strength, elevation, arrow and/or any other condition which might affect the flight pattern of the arrow. Alternatively, the markings 44 could be selectively removed and attached to the wheel 42, such as by being on a tape or strip of material that could be wrapped around and attached to the wheel or a removable spool 46, which could be secured or selectively attached to the wheel 42 by a fastener 48, for example, an inset screw. One tape system is disclosed in U.S. Pat. No. 9,453,709, owned by the Applicant and which e hereby incorporated by reference herein in its entirety for all purposes.

Figure 2B:
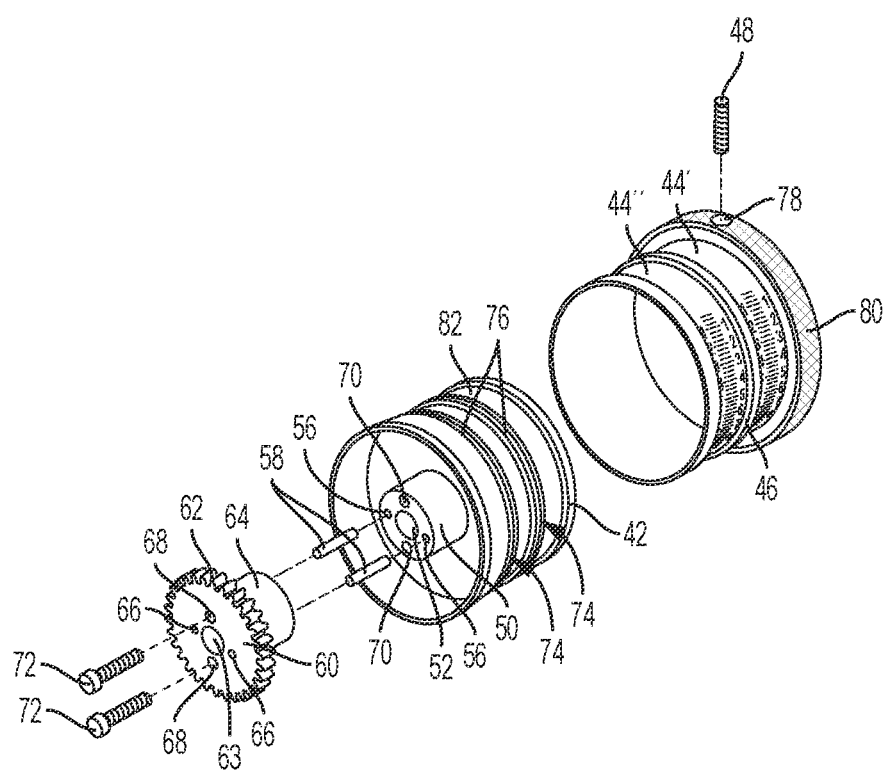
FIG. 2B is an exploded perspective view of the dial, spool and gear of FIG. 1.
Figure 2C:
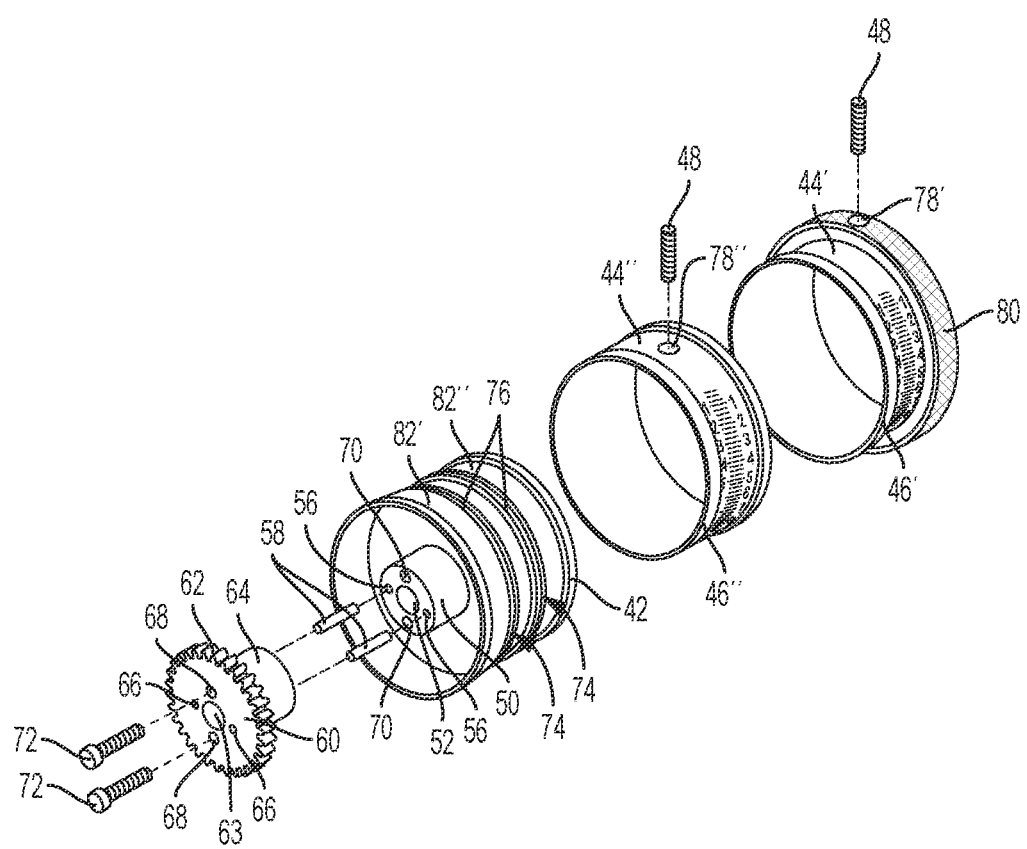
FIG. 2C is an exploded perspective view of an alternative embodiment of a dial, spool and gear.

In one embodiment, as seen in FIG. 2B, the dial 42 has a boss 50. The boss 50 has a central bore 52 through which a pin 54 extends as is further described below. In the embodiment seen in FIG. 213, the boss 50 also includes a number of holes around the central bore 52. The left and right holes 56 are configured to each receive a pin 58 such that when inserted, a portion of the pin extends from the surface of the boss 50.

A pinion gear 60 has one end that includes a plurality of teeth 62 and a second end that has a shoulder 64. In the embodiment seen in FIG. 2B, the pinion gear 60 has a number of holes around a central bore 63 that line up with the central bore 52 and holes of the dial 42 when the end of the boss 50 is adjacent the shoulder 64. One pair of holes in the pinion gear 60, the right and left holes 66, are configured to receive the portion of the pins 58 that extend from the surface of the boss 50.

A second pair of holes in the pinion gear, the top and bottom holes 68, line up with the top and bottom holes 70 in the boss. A fastener 72, such as a screw, is inserted into each of the pairs of holes 68, 70 to attach or connect the pinion gear 60 to the boss 50 and, thereby, the dial 42. The pins 58 help orient the pinion gear 60 with respect to the boss 50 and make it easier to attach the pinion gear as well as provide additional engagement strength. There are a number of known methods for connecting such parts, for example, fastening, welding, adhering, etc., the alternative or additional use of which would not defeat the spirit of the invention.

In one embodiment the pinion gear 60 is made from a plastic, e.g. acetal. This prevents a metal (from the gear) to metal (from the slide member) contact, which offers a smoother feel when using the dial 46. However, the pinion gear 60 could also be integrally formed with the spool 42 or made from a number of other materials known in the industry, for example, metals, wood, carbon fiber, Teflon, nylon, or other suitable plastic material, without defeating the spirit of the invention.

A spool 46 is configured to slide on and be attached to the dial 42. The surface of the dial 42 may also include one or more grooves 74 formed therein configure to receive a rubber O-ring 76. The grooves 74 are sized such that when the O-rings 76 are in the grooves, the tops of the O-rings will extend above the surface. When the spool 46 is slid onto the dial 42, the spool will encounter the O-ring(s) 76. As the spool 46 slides over the O-rings) 76, it will compress the O-rings and thereby remove the "play" or space or tolerance between the dial 42 and spool such that it does not wiggle. When the fasteners 48 are tightened, the spool 42 will flex to fully compress the O-ring(s) 76 and allow contact between the spool and the dial 42. This contact results in friction which helps the spool 46 and dial 42 rotate together. The O-rings 76 may also provide some dampening benefit as well.

The spool 46 may also have one more holes 78 formed therein to receive a fastener, such as a threaded insert 48. In the embodiment seen in FIG. 2B, the spool 46 has one hole 78, one hole located in the knurled grip portion 80 of the spool. The threaded insert 48 will thread down at least partially through the hole 78 and into contact with the exterior surface of the dial 42 and thereby create a tensile force to secure the spool 46 to the dial.

The dial 42 may also have or more annular recesses 82 formed therein configure to receive the end of the threaded insert(s) 48. In the embodiment seen in FIG. 2B, the dial 42 has one annular recess 82 to receive the insert 48. The annular recess(es) 82 prevents marring or damage to the surface of the dial 42 from contact with the inserts 48 when in the inserts are located in the recessed which could interfere with the removal and/or installation of the spool 46 on the dial and provides additional lateral resistance to prevent the spool from being pulled off of the dial.

Having removable markings or measurement systems 44 and/or spools 46 allows the sight apparatus 10 to be easily adaptable to a given factor or factors such as those described above or others including altitude, humidity, temperature, wind, atmospheric pressure, arrow velocity, trajectory, etc. In one embodiment, the spool 46 has a first set of selectively removable markings or indicia 44' and a second set of selectively removable markings or indicia 44".

In an alternative exemplar embodiment, the spool 46 is comprised of multiple spools. In the embodiment seen in FIG. 2C, there is a first spool 46' with a first hole 78' in the knurled portion 80 and first set of markings 44' and a second spool 46" with a second hole 78" and second set of markings 44". The dial 42 seen in FIG. 2C includes a first annular recess 82' to receive the insert 48 in the first hole 78' and a second annular recess 82" to receive the insert 48 in the second hole 78". In this embodiment, the fastener 48 can be loosened in one spool 46 and the spool adjusted without adjusting the other spool.

Figure 9A:
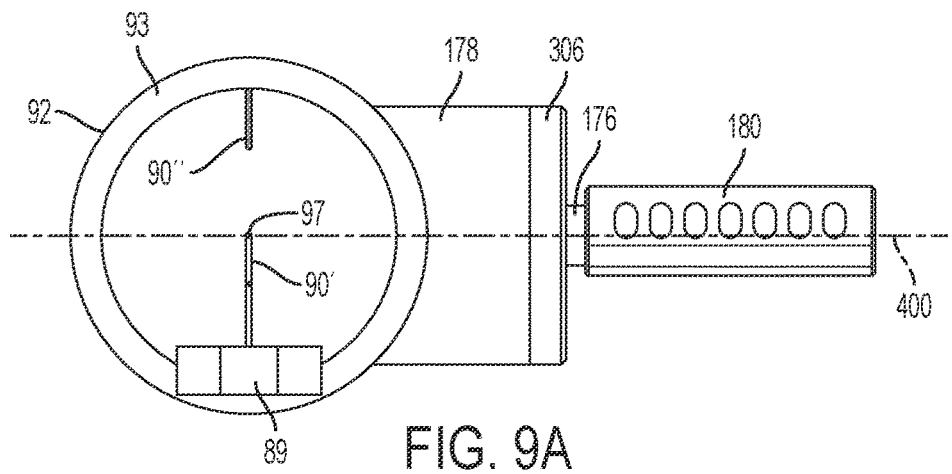
FIG. 9A is a front elevation view of a portion of the sight apparatus of FIG. 1.
Figure 9B:
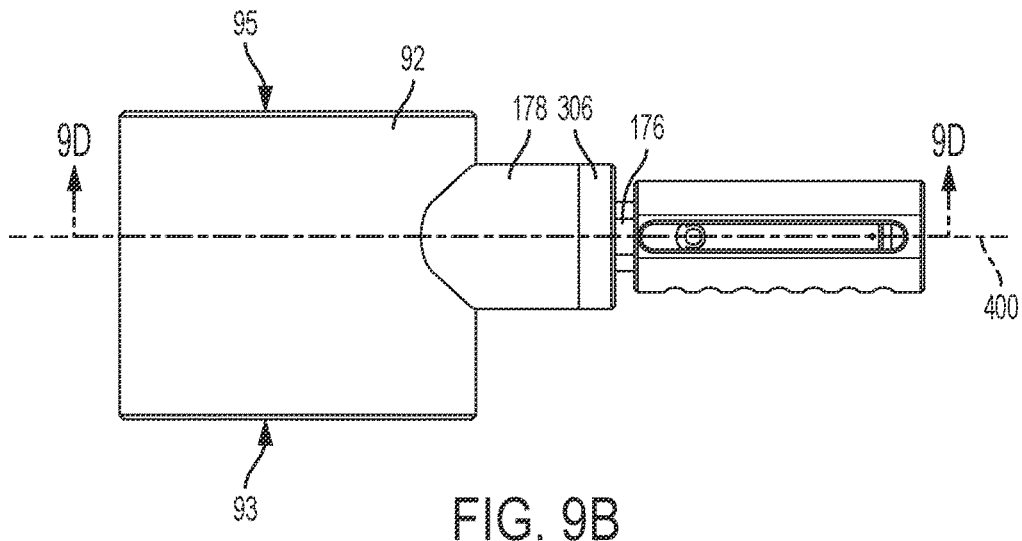
FIG. 9B is a top plan view of a portion of the portion of the sight apparatus of FIG. 9A.
Figure 9C:
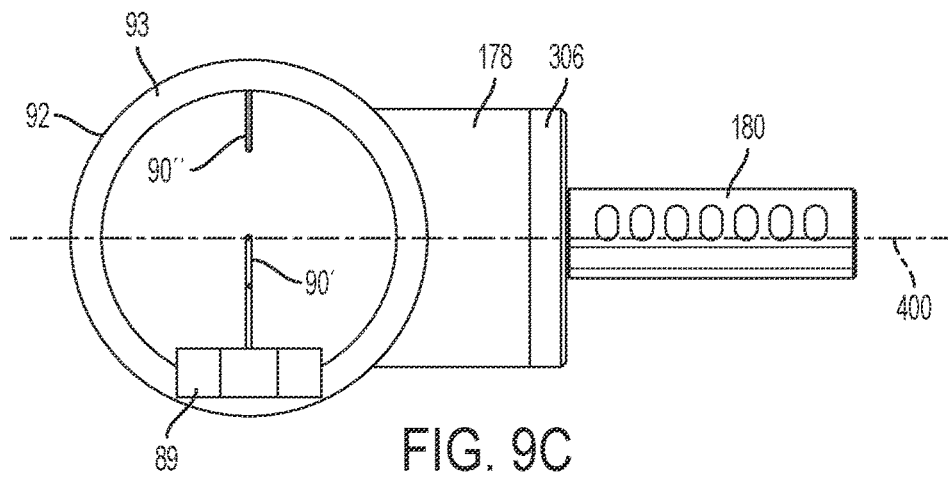

In one embodiment, the scope head, sight housing or aiming ring 92 may have a number of sight pins and, in the embodiment seen in FIG. 9B, has a first sight pin 90' and a second sight pin 90". The scope head 92, may also have a level 89 to permit the user of the bow to which the sight is attached ensure that the bow and, thereby, the sight is being held level. The level 89 could be located on the top or bottom of the scope head 92 and more than one level could be used without defeating the spirit of the invention. In this embodiment, the first set of markings 44' correspond to the first sight pin 90' and the second set of markings 44" correspond to the second sight pin 90". The first 44' and second set of markings 44" could be on the same spool 46 or on a first 46' and second spool 46". Alternative, the first 44' and/or second set of markings 44" could be selectively removable to permit the first sight pin 90' and a second sight pin 90" to be used with different distances, elevations, etc. In another alternative embodiment, one spool, for example the first spool 46', could include two markings, for example the first 44' and second markings 44" and one or more indicators without defeating the spirit of the invention. In yet another alternative embodiment, one spool, for example the first spool 46', could include one marking, for example the first marking 44', and one or more indicators without defeating the spirit of the invention.

Each of the first set of selectively removable markings 44' and a second set of selectively removable markings 44" can be adjusted to correspond to a first factor and second factor respectively. For example, the first set of selectively removable markings 44' could apply to a shooting an arrow at a first set of distances, e.g. 0-100 yards, and the second set of selectively removable markings 44" at a second set of distances, e.g. 100-200 yards. In an embodiment with multiple sight pins, such as seen in FIG. 4B, the first sight pin 90' could be used with the first set of selectively removable markings 44' for a closer set of distances and the second sight pin 90" could be used with the second set of selectively removable markings 44" for a farther set of distances. Other examples of factors could include two different types of arrows e.g. weights, lengths, sizes), draw weights, etc. The first factor could be a different from the second factor by being a different factor or the same factor, but a different range or setting for such factor.

To make the selected indicia 44 easily seen, the adjustable member 16 may also have an indicator or marker 84. The indicator 84 may have a first pointer 86 that indicates the selected first marking or indicia on the first set of selectively removable markings 44' located on the dial 42 and a second pointer 88 that indicates the selected second marking or indicia on the second set of selectively removable markings 44" located on the dial 42. The pointers 86, 88 could be a simple line or arrow or may be made from a material that is easy to see in low light conditions, for example, fiber optic materials. Further, the indicator could include a magnifying element to make the selected indicia 44 even more easily seen. Rotation of the dial 42 changes the first marking identified by the first pointer 86 and the second marking identified by the second pointer 88. Changing the first indicia adjusts the sight pin 90' for a first factor. Changing the second indicia adjusts the sight pin 90" for a second factor. In one embodiment, rotation of the dial 42 rotates the first set of markings 44' and the second set of markings 44".

One method of using the sight 10 can be first positioning the sight pin 90 in front of a target and then shooting an arrow or projectile at the target. The dial 42 is rotated to adjust the sight pin 90, the sight pin positioned in front of the target and the arrow fired. This process is repeated until the projectile hits the target. A first set of markings 44' can be applied to the dial 42 for a first factor. For example, if the target was at twenty yards and the draw weight was at forty pounds, the first set of markings 44' could applied to the spool 46 such that the first marking, e.g. "20," is identified by the first pointer 86. In an alternative embodiment, the fastener 48 for the first spool 46' can be loosened and then the first spool rotated such that a marking of the first set of markings 44', e.g. "20," is identified by the first pointer 86 to correspond with the first factor.

The second sight pin 90" can then be placed in front of a different target, for example at one hundred yards, and then shooting an arrow or projectile at the target. The dial 42 is the rotated to adjust the sight pin 90", the sight pin positioned in from of the of the target and the arrow fired. This process is repeated until the projectile hits the target. A second set of markings 44" can be applied to the dial 42 for a second factor. For example, if the target was at one hundred yards, the second set of markings 44" could applied to the spool 46 such that the second marking, e.g. "100," is identified by the second pointer 88. In an alternative embodiment, the fastener 48 for the second spool 46" can be loosened and then the second spool rotated such that a marking of the first set of markings 44', e.g. "100," is identified by the second pointer 88 to correspond with the second factor.

One such correction mechanism permits adjustment to the line of sight through a scope head 92 vertically, e.g. up or down. This type of adjustment is often referred to as elevation adjustment.

The embodiment seen in FIG. 2A includes the translation of rotation from a dial 42 engaged with or rotatably connected to the frame and engaged with the scope head 92 to linearly, e.g. vertical, move the sight pin. One way to accomplish such translation is through a rack-and-pinion or drum-and-slide mechanism, such as that disclosed in U.S. Pat. Nos. 10,036,612 and 9,909,839, owned by the Applicant and which are hereby incorporated by reference herein in their entirety for purposes. The drum could be a circular or pinion gear 60 connected to the wheel 42, which pinion gear engages a slide member 94, such as the teeth 96 of the linear gear bar or rack 98 of a slide member, the slide being connected to the sight pin 90 as discussed further below. The engagement between the drum 60 and slide member 94 causes the slide, and thereby the scope head 92 and sight pin 90, to move up and down in response to rotation of the drum, e.g. by rotation of the dial or wheel 42.

As referenced above, the slide member 94 carries the rack gear, linear gear bar or vertical gear 98, which has a set of bar teeth 96 for engaging the pinion teeth 62 of the pinion gear 60. The slide member 94 is engaged with, e.g. slidably held to, a first part of the housing, in FIG. 2A the adjustment member 16. The slide member 94 can also have a groove 100 in which at least one member, such as bushings 102, 104 as discussed further below, extends.

One such correction mechanism permits adjustment to the line of sight through a sight pin 90 in a scope head 92 laterally, e.g. left or right when looking through the scope head. This type of adjustment is often referred to as windage adjustment. One way to adjust for windage is disclosed in U.S. Pat. Nos. 10,190,851 and 10,443,983, owned by the Applicant and which are hereby incorporated by reference herein in their entirety for all purposes.

In the embodiment shown in FIG. 1, the wheel 42 is of a type disclosed and described in U.S. Pat. No. 9,453,709. In addition to the wheel disclosed and described in U.S. Pat. No. 9,453,709, the wheel 42 shown in FIG. 1 is attached to a gear. As seen most clearly in FIG. 2A, the peg, post or pin 54 on which the wheel 42 resides and rotates about is secured to side plate 106. Alternatively, the peg 54 could also be attached or formed with the adjustment member 16. The peg 54 may have an un-threaded portion on which the wheel may rotate and a threaded portion which is used to attach the wheel to the peg, as will be discussed in more detail below.

In the embodiment shown in FIG. 2A, the peg 54 is secured to a nut 108 with a collar and a threaded opening. In the nut 108, however, the threaded opening is offset or eccentric from the center of the nut, rather than centered as is usually the case. The peg 54 is secured in the hole of the nut 108, and thus is offset with respect to the nut. A hat bushing 110 is press-fit into an opening 112 in the side plate 106. The nut 108 is then press fit into the hat bushing 110 to rotatably hold the nut and peg 54 to the side plate 106. The offset attachment of the peg 54 to the nut 108 allows the position of the peg to be moved by rotation of the nut as will be discussed in more detail below.

The side plate 106 is attached to the adjustment member 16 by two fasteners 114, 116. When the side plate 106 is attached to the adjustment member 16, the peg 54 extends through the adjustment member 16.

The gear 60 has a bore 63 through which the peg 54 may extend. The peg 54 also extends through the hole 52 in the wheel 42 and engages with a lock knob or wing nut 118. A screw or other threaded fastener 120 is threaded into a threaded opening 122 in the end of the peg 54 to rotatably retain the wheel 42 and gear 60 as described in more detail below. The wing nut 118 is part of locking system or means that is used to selectively lock the wheel 42 in a desired position. For example, the locking means may be movable between a first position, by turning the wing nut 118 clockwise, toward a position where the wheel 42 is prevented from rotating, and a second position, by turning the wing nut counter-clockwise, toward a position which allows the wheel to be rotated. In neither case does the rotation of the locking means move the wheel, in moving the locking means between the first and second positions.

When assembled, the gear 60 is held within an enclosure 124 of the adjustment member 16. The enclosure 124 shown in FIG. 2A has an opening 126 which exposes the teeth 62 of the gear 60 such that the teeth can engage with the teeth 96 of the rack 98 as will be discussed in more detail below. A washer 128 can also be placed on the peg 54 between the gear 60 and the adjustable member 16 to allow the gear to rotate more freely. A silicone or other lubricant can also be used to permit the gear 60, and thereby the wheel 42, to rotate more freely.

As referenced above, the slide member 94 carries the rack gear, linear gear bar or vertical gear 98, which has a set of teeth 96 for engaging the teeth 62 of the gear 60. As seen in FIG. 2A, the rack 98 can be set in a groove in the slide member 94 and attached with pins, such as press fit pins. The rack 98 could also be integrally formed with the slide member 94 or attached in a variety of other ways known in the industry, e.g. welding, riveting, adhering, etc. The slide member 94 is slidably held or retained between a first and second part of the housing, in this instance the side plate 106 and the adjustment member 16 in FIG. 2A. The slide member 94 can also have a slot or groove in which a projection, for example, a bushing, from the housing is located.

Figure 7:
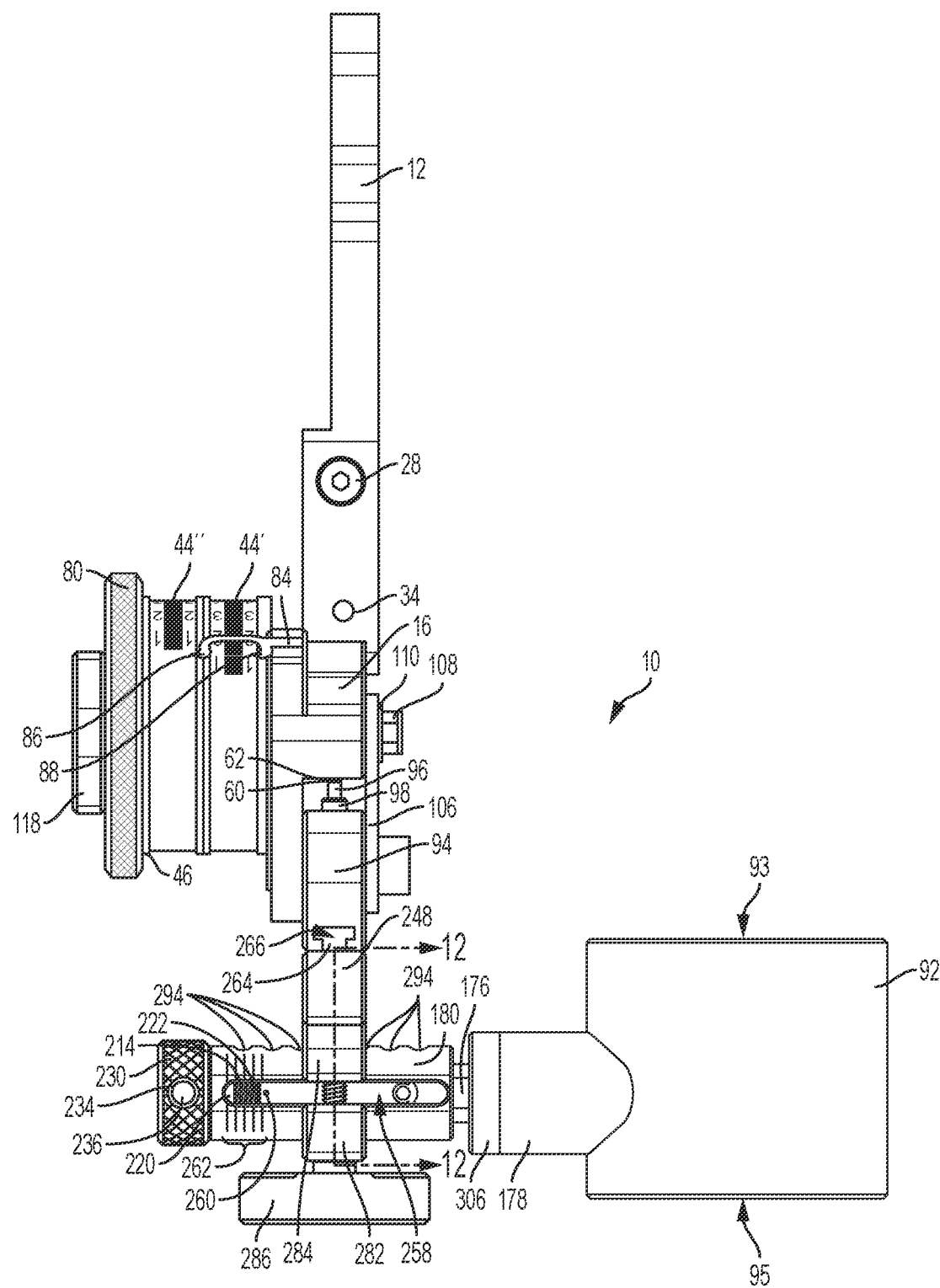
FIG. 7 is top plan view of the sight apparatus of FIG. 1.

In the embodiment shown, the adjustment member 16 has two vertically aligned holes 130, 132. A first fastener 134 extends through a first bushing 102 and a first washer 136 and into the first hole 130 to hold the first bushing and first washer to the adjustment member 16. A second fastener 138 extends through a second bushing 104 and a second washer 140 and into the second hole 132, to hold the second bushing and second washer to the adjustment member 16. When the sight apparatus 10 is assembled, the two bushings 102, 104 are located in a vertical slot 100 formed in the slide member 94 and the washers 136, 140 will both contact one side of the slide member as seen in FIGS. 2 and 7.

FIG. 2A illustrates two recesses 142, 144 which are located on the interior side of the side plate 106 with a threaded hole 146, 148 extending through the center of each recess. Within each recess 142, 144, an O-ring, 150, 152 is located within a groove 154, 156 around the threaded holes 146, 148, respectively, such that only a portion of the O-ring extends into the recess as best seen in FIG. 7. A first plate 158, 160 is located in each recess 142, 144 against a respective O-ring 150, 152, and a second plate 162, 164 is respectively located on top of each first plate. The second plates 162, 164 will contact the slide member 94 when the sight apparatus 10 is assembled.

A fastener 166, 168 is inserted into each respective threaded hole 146, 148. The fasteners 166, 168 shown in FIG. 2A have no head such that their depth can be selectively set. The depth of the fasteners 166, 168 will selectively determine the ease with which the slide member 94 will slide. For example, when the fasteners 166, 168 extend into the recesses 142, 144, they push the first plates 158, 160, and thereby, the second plates 162, 164, respectively, into contact with the slide member 94 to sandwich the slide member between the second plates and the washers 136, 140. The deeper the fasteners 166, 168 are threaded into the threaded holes 146, 148, the further the first plates 158, 160 are pushed towards the second plates 162, 164, which are pushed further out of the recesses 142, 144, respectively, and into contact with the side of the slide member 94, causing greater friction between the slide member and the second plates and the washers 136, 140.

In the embodiment shown in FIG. 2A, the O-rings 150, 152 perform several functions. The depth of the recesses 142, 144 in combination with the depth of the grooves 154, 156 in which the O-rings 150, 152 reside are sized in relation to the first plates 158, 160 and second plates 162, 164 such that when side plate 106 is attached to the adjustable member 16, the plates 158, 160, 162, 164 apply some pressure on the slide member 94. The fasteners 166, 168 can then be used to add additional pressure as described above. The O-rings 150, 152 also provide friction with the first plates 158, 160 to prevent the first plates from spinning as the slide member 94 is moved and keeps the first plates and thereby the second plates 162, 164 from tilting within the recess, such as when one of the fasteners 166, 168 contacts them.

The washers 136, 140 could also be separated from the bushings 102, 104 and be plates of similar configuration and perform similarly to the second plates 162, 164. The washers 136, 140 could be located in recesses in the adjustment member and employ threaded inserts to adjust the amount of force applied to the slide member 94, and thereby, the rack 98. The bushings 102, 104 could also be press fit into the slot 100 in addition to, or so as to avoid the need for, the side plate 106.

The bushings 102, 104, second plates 162, 164, and/or the washers 128, 136, 140 can be made of a low friction material, such as Teflon, nylon, or other suitable plastic material. Any low friction material known in the art may be used, without departing from the scope of the invention. The use of a harder material, such as metal for the first plates 158, 160 protects the second plate 162, 164 from the fasteners 166, 168. The sides of slide member 94 and/or the slot 100 could be made from a low friction material in addition or alternatively to the bushings 102, 104, plastic plates 162, 164, and/or washers 136, 140.

As the wheel 42 is rotated, the gear 60 is rotated as are the teeth 62 on the gear. Because the teeth 62 from the gear 60 are engaged with the teeth 96 from the rack 98, rotating the wheel 42 in a first direction, e.g. counterclockwise, will cause vertical linear movement of the rack, and thereby the slide member 94 and sight pin 90, e.g. up or raised, as seen by comparing FIGS. 3-4. As the wheel 42 is rotated in a second direction, e.g., clockwise, the rack 98, slide member 94 and sight pin 90 are moved downward or lowered.

The amount, depth or force with which the teeth 62 of the gear 60 engage the teeth 96 of the rack 98 can be set by rotation of the nut 108. Because the threaded hole in nut 108 is offset or eccentric, peg 54 is attached to the nut in an offset or eccentric manner, and rotation of the nut will move the peg, and thereby, the wheel 42, gear 60 and teeth 62, toward or away from the rack 98. The hat bushing 110 allows the nut 108 to selectively rotate, but not be removed from the side plate 106. A nut and offset peg could be attached to the frame of the sight apparatus in other ways without departing from the spirit of the invention. For example, the collar of the nut 108 could be threaded and screwed into a threaded hole in the side plate 106. A fastener could extend through a hole in the side plate to contact the nut 108 to prevent the nut from being further rotated and withdrawn from the nut when it is desired to rotate the nut.

The bushings 102, 104 are sized to fit or be slidably received in the slot 100 such that there is little to no play. Therefore, as seen most clearly in FIGS. 6-7, as the teeth 62 from the gear 60 engage with the teeth 96 from the rack 98, the interaction of the bushings 102, 104 within the vertical slot 100 causes the movement of the slide member 94 to be vertical in accordance with the slot.

The limits of vertical adjustment for the slide member 94, and thereby the scope head 92, can be set by the top bushing 102 contacting the top or first end 170 of the slot 100 and the bottom bushing 104 contacting the bottom or second end 172 of the slot. Other frames, frame elements and connections, such as connecting slide member 94 to adjustable member 16 are disclosed in in U.S. Pat. No. 10,443,983, owned by the Applicant and which is hereby incorporated by reference herein in its entirety for all purposes.

The scope head or sight mount 92 is attached to the slide member 94 such that as the slide member moves up or down in response to the rotation of the dial 42, the scope head also moves up and down to thereby selectively adjust the sight apparatus 10.

Some prior art sights utilize multiple sight pins to differentiate between different distances. However, the more sights pins that are in the scope head, the more of the target within the scope head that is obscured by such sight pins making it harder to place the correct sight pin on the desired location of the target. This problem is emphasized when shooting a greater distance, e.g. 100 yards. At a greater distance, the sight pin may obscure a larger portion of the target as the target is smaller due to the distance it is away from the sight user.

In the embodiment shown in FIGS. 9A-9G, the scope head 92 is rotatable with respect to the frame 12 such that both sides of the scope head 92 can be used for different factors, including, but not limited to, distance, draw strength, elevation, arrow type, wind, etc. In one embodiment, the rotatable scope head 92 permits the sight to be changed between at least two different factors without the need for tools, which can permit the change to be quicker, quieter and more discrete.

Figure 3:
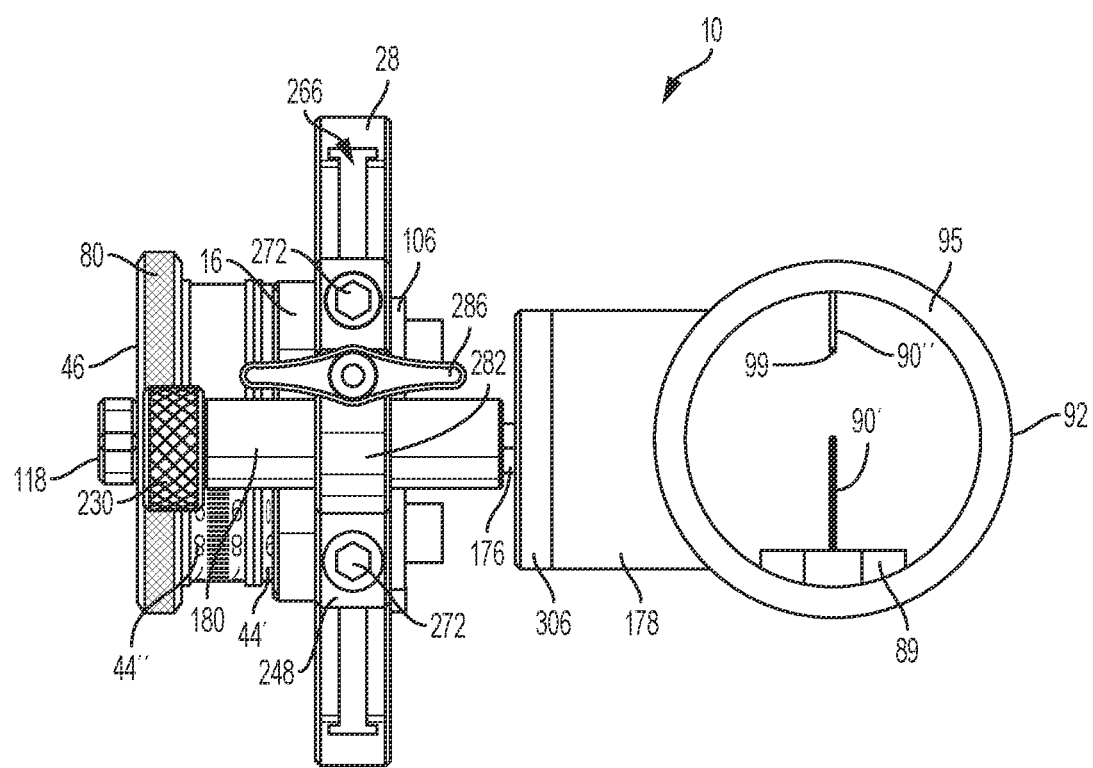
FIG. 3 is a rear elevation view of the sight apparatus of FIG. 1.
Figure 4:
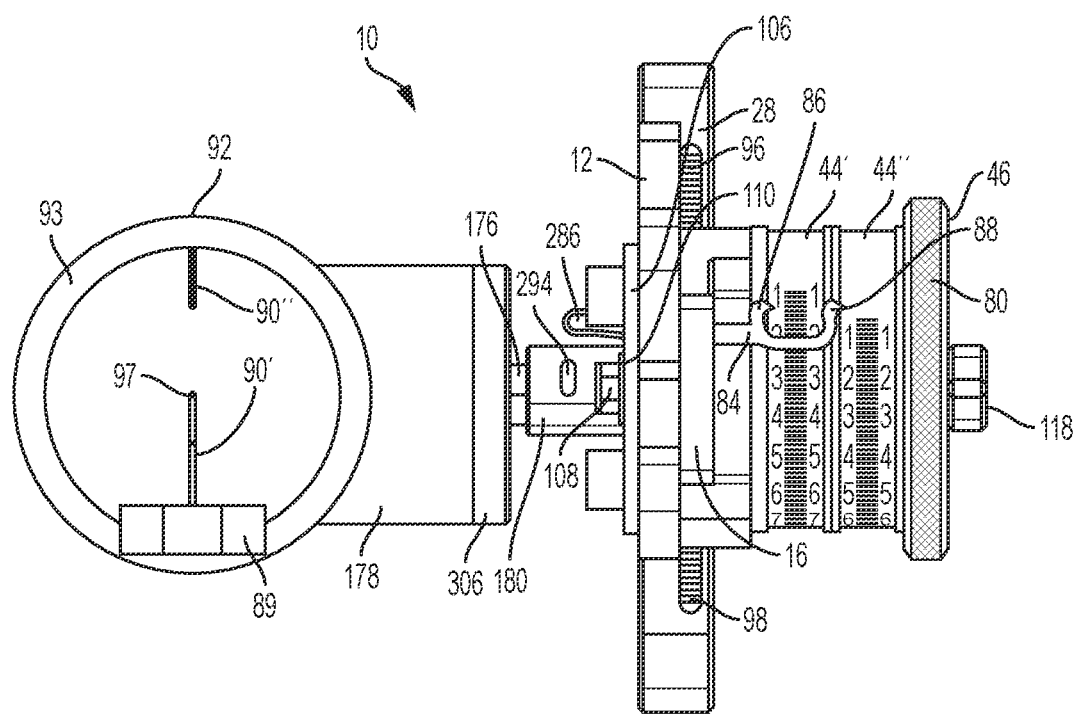
FIG. 4 is a front elevation view of the sight apparatus of FIG. 1.

In one embodiment, the scope head 92 has a first end 93 and a second end 95. In the orientation seen in FIG. 1, the first end 93 is facing the user of the sight 10. The first end has a first sight pin 90' extending up from the bottom of the scope head. In the orientation, the head 97 of the first sight pin 90' is seen and can be used to shoot an arrow from the bow at a first environment, condition or other constraint, for example a first distance. As seen in FIG. 3, the second end 95 has a second sight pin 90" extending down from the top of the scope head 92, with the scope head in the orientation seen therein. From the second end 95, the head 99 of the second sight pin 90" is seen. When the scope head 92 is rotated, as will be discussed further below, the second sight pin 90" can be used to shoot an arrow from the bow at a second environment, condition or other constraint, for example a second distance.

When it is desired to shoot at the first distance, for example, a closer distance, the first sight pin 90' can be used. And when it is desired to shoot at a second distance, for example a farther distance, the scope head 92 may be rotated 180°, or a half of one rotation, such that the second end 95 of the scope head faces the user of the sight 10. In this orientation, the second sight pin 90" extends up from the, now, bottom of the scope head 92. In the embodiment seen in FIG. 9B, the scope head 92 rotates about an axis 400 which is generally lateral to the longitudinal axis of the frame 12.

The scope head 92 could include a first set of sight pins that are used when the scope head is in a first orientation and a second set of sight pins that are used when the scope head is in a second orientation.

Figure 9D:
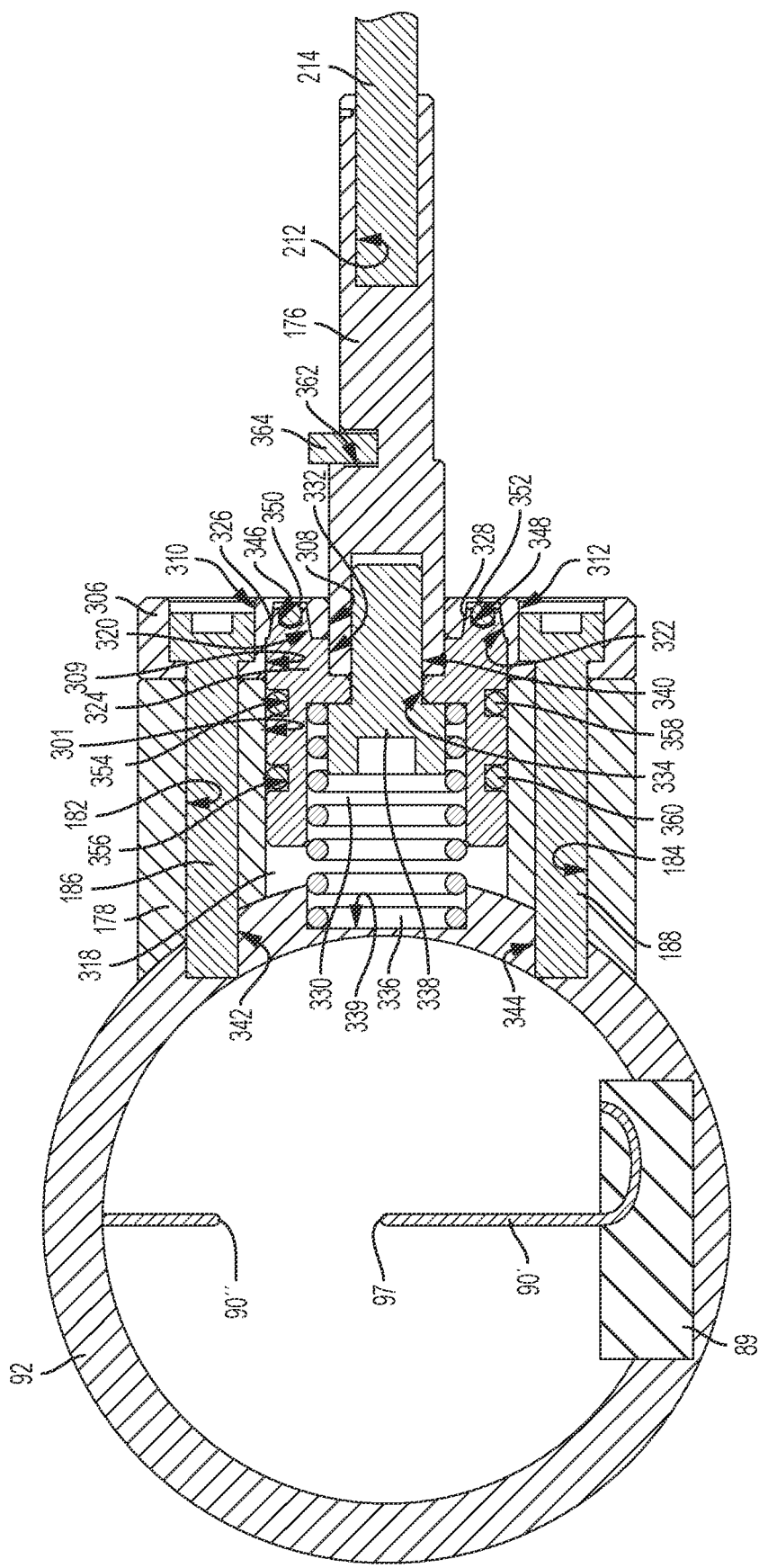
FIG. 9D is a front cross-sectional elevation view of the portion of the portion of the sight apparatus of FIG. 9A.
Figure 9E:
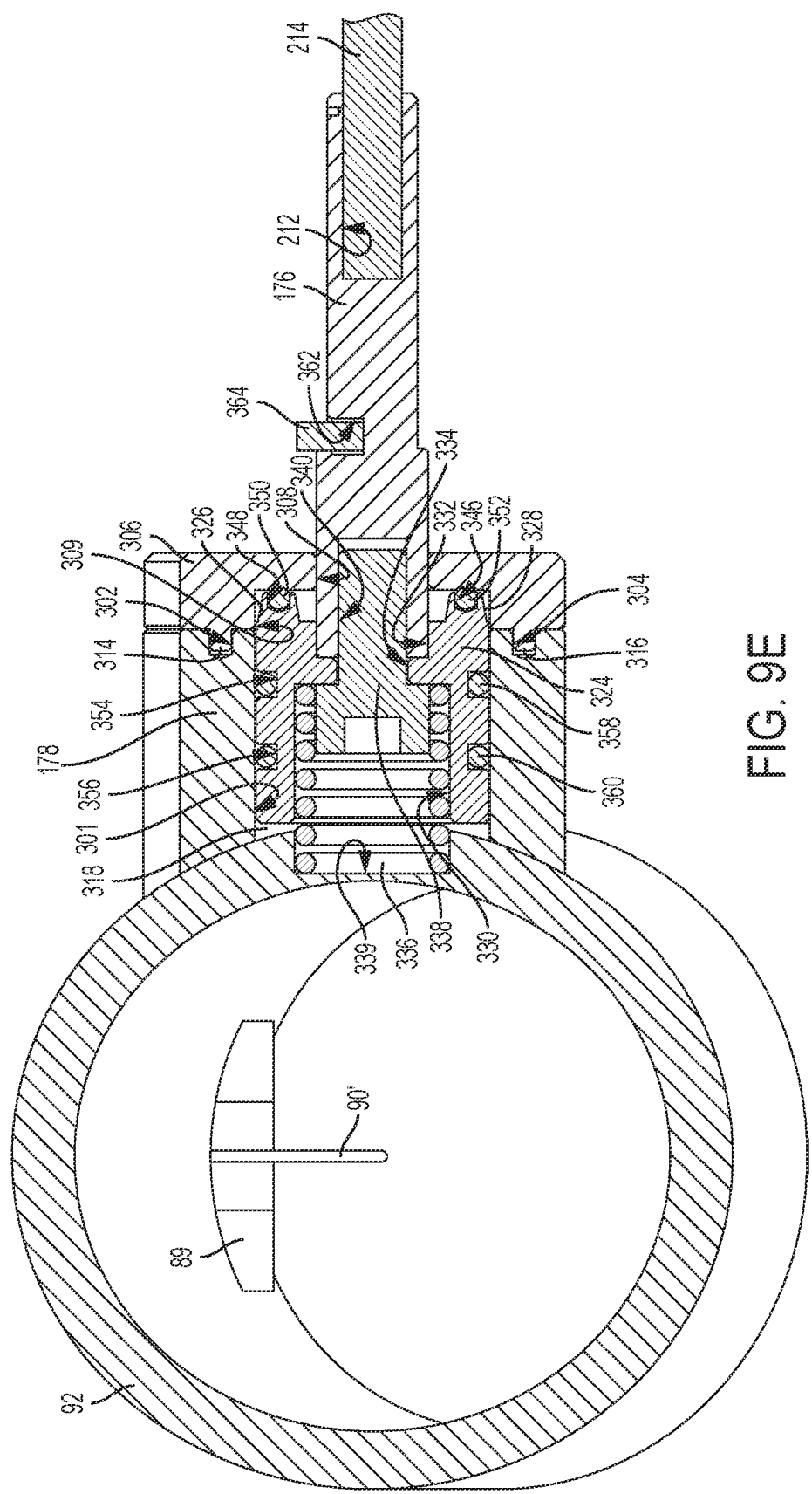
FIG. 9E is a front cross-sectional elevation view of the portion of the portion of the sight apparatus of FIG. 9A with the scope head rotated about 120 degrees.

In the embodiment shown in FIGS. 9A-9G and 10B-D, a scope mount, in one embodiment including scope casing 178 and scope cap 306, is attached to the scope head 92. As seen in FIG. 9D, the scope casing has a casing bore 301 formed therein and a first casing through hole 182 and a second casing through hole 184. As seen in FIG. 9E, the scope casing 178 also includes a first recession 302 and a second recession 304.

A scope cap 306 is configured to attach to the scope casing 178. The scope cap 306 includes a cap bore 308 and cap cavity 309 formed therein and a first cap through hole 310 and a second cap through hole 312. The scope cap includes a first detent 314 and a second detent 316. The first 314 and second detents 316 are configured to be received in the first recession 302 and second recession 304, respectively, when the scope cap 306 is attached to the scope casing 178. This arrangement helps ensure that the scope cap 306 is properly oriented, for example, square, with respect to the scope casing 178. The scope cap 306 and the scope casing 178 could also be attached in a number of known means for attaching such components, e.g. integrally forming, welding, threading, gluing, etc., the use of which would not defeat the spirit of the invention.

When the scope cap 306 is attached to the scope casing 178, the first casing through hole 182 lines up with the first cap through hole 310, the second casing through hole 184 lines up with the second cap through hole 312 and the casing bore 301 lines up with the cap bore 308.

In the embodiment seen in FIG. 9D, the cap bore 308 is smaller than the casing bore 301 such that when the scope cap 306 is attached to the scope casing 178, a pocket 318 is formed. The scope cap 306 includes a first indentation 320 and a second indentation 322 that are exposed to the pocket 318.

A pod 324 is located within the pocket 318. The pod 324 includes a first tab 326 and a second tab 328 that are configured to fit in the first indentation 320 and the second indentation 322 when the pod is located within the pocket 318. The first 326 and second tabs 328 and/or the first 320 and second indentations 322 can be tapered in order to permit the first and second tabs to more easily be removed from and/or returned to the first and second indentations.

The pod 324 has a pod cavity 330 formed therein on a first side of the pod and a stem cavity 332 formed therein on a second side of the pod. A pod bore 334 extends from the pod cavity 330 to the stem cavity 332. A resilient member 336, such as a spring, is located in the pod cavity. The spring pushes against the scope head 92 to urge the pod towards the scope cap 306 and the scope head away from the stem 176. In the embodiment seen in FIG. 9D, the scope head includes a spring concavity 339 in which the resilient member 336 is partially located.

A first side of a stem 176 extends through the cap bore 308 and into the stem cavity 332 of the pod 324. A stem fastener 338 extends from inside the pod cavity 330, through the pod bore 334 and into a first stem bore 340 to secure the pod 324 to the stem 176.

The scope cap 306 and scope casing 178 are attached to the scope head 92 by a first scope fastener 186 extending through the first casing through hole 182 and the first cap through hole 310 and a second scope fastener 188 extending through the second casing through hole 184 and the second cap through hole 312. The first scope fastener 186 and second scope fastener 188 are secured in a first scope head hole 342 and a second scope head hole 344 to secure the scope cap 306 and scope casing 178 to the scope head 92.

Figure 9F:
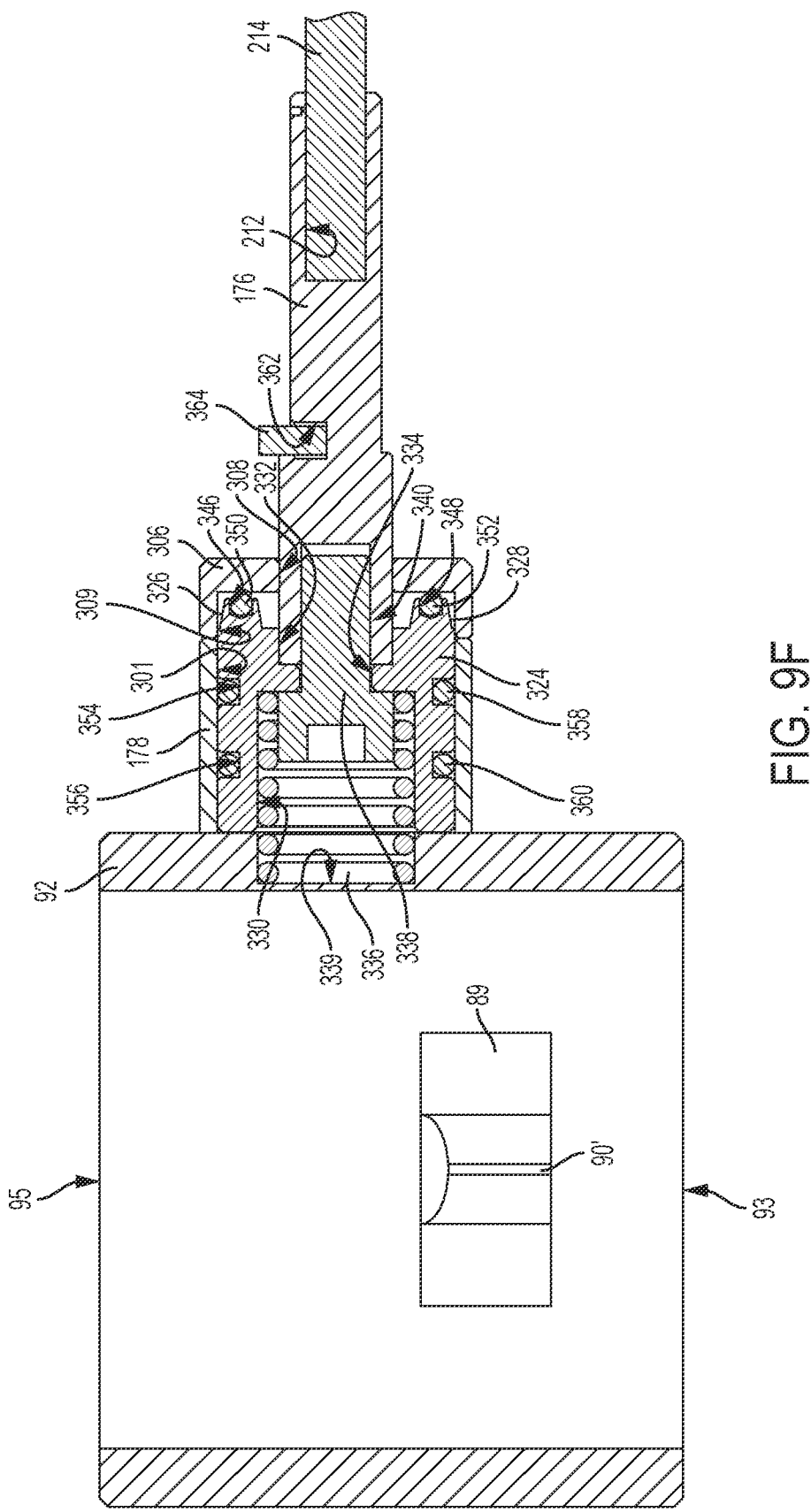
FIG. 9F is a front cross-sectional elevation view of the portion of the portion of the sight apparatus of FIG. 9A with the scope head rotated 90 degrees.
Figure 9G:
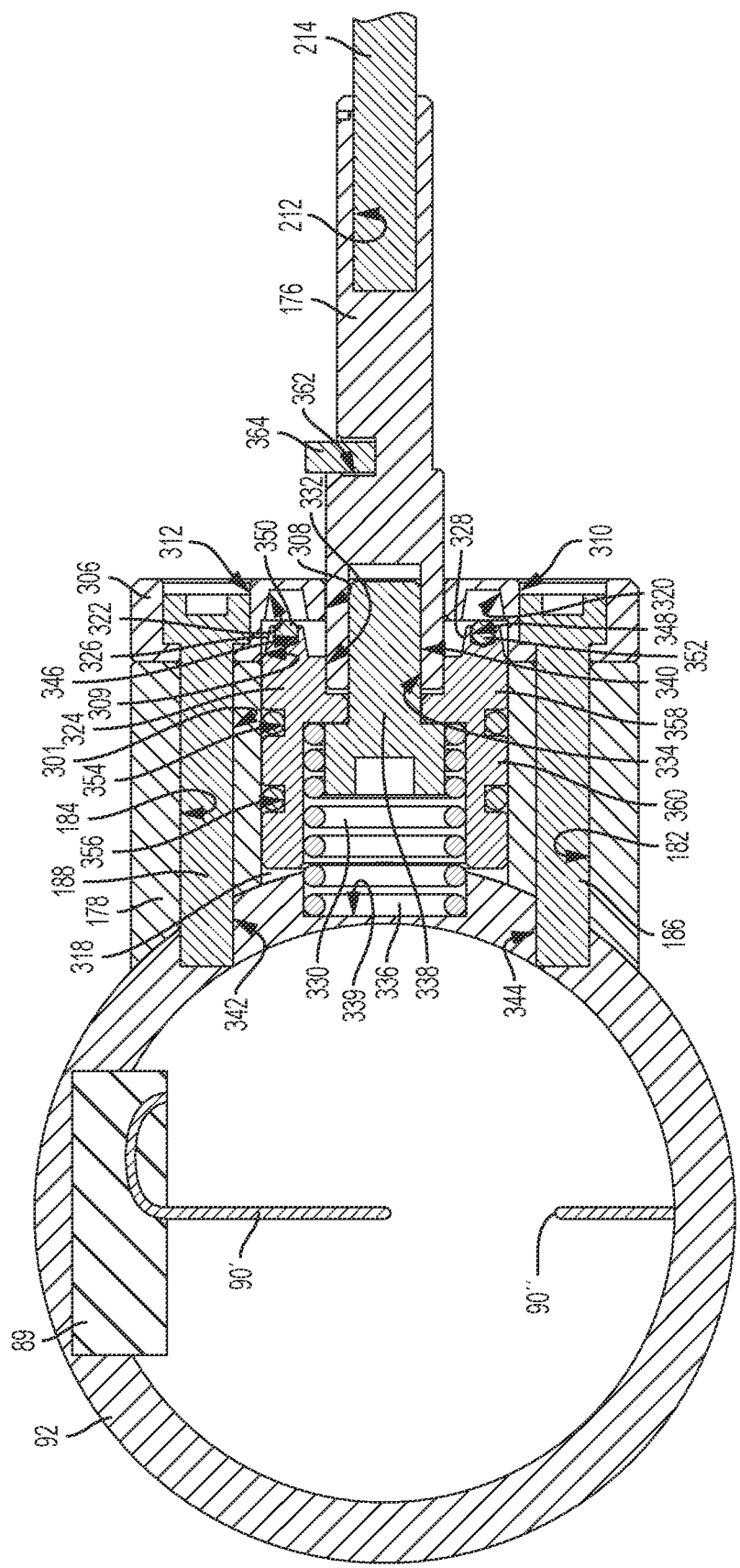
FIG. 9G is a front cross-sectional elevation view of the portion of the portion of the sight apparatus of FIG. 9A with the scope head rotated 180 degrees.

When it is desired to rotate the scope head 92, for example to use the second sighting pin 90", the scope head and, thereby, the scope cap 306 and scope casing 178 can be pushed towards the frame 12 or stem 176. As seen in FIG. 9E-9G, as the scope head 92, the scope cap 306 and scope casing 178 are moved towards the frame 12, the resilient member 336 compresses, and in a compressed position, and the first 326 and second tab 328 are separated from the first indentation 320 and the second indentation 322, respectively. With the first 326 and second tab 328 are separated from the first indentation 320 and the second indentation 322, the scope head 92, the scope cap 306 and scope casing 178 are moved to an unseated position in which they can be rotated as seen in FIG. 9G. Once the scope head 92, the scope cap 306 and scope casing 178 are rotated a little, the resilient member 336 can be allowed to urge the scope head, the scope cap and scope casing back towards its first or original position, such that first 326 and second tab 328 rest or ride against the scope cap. The scope head 92 and, thereby, the scope cap 306 and scope casing 178 can be rotated until the first 326 and second tab 328 are in the second indentation 322 and the first indentation 320, respectively as seen in FIG. 9G. With the first 326 and second tab 328 in the first indentation 320 and the second indentation 322, the scope head 92, the scope cap 306 and scope casing 178 are moved to seated position in which they cannot be rotated and the resilient member 336 is returned to its decompressed position (although the resilient member will still be under some compression, just not as must as when it's in its compressed position).

In one embodiment, the first 326 and second tab 328 can include a blind bore 346, 348, respectively. A ball bearing 350, 352 is seated in the blind bores 346, 348. When the first 326 and second tab 328 are out of the first indentation 320 and the second indentation 322 and the resilient member urges the pod 234 against the scope cap 306, the ball bearings 350, 352 allow the scope cap 306 to be rotated smoothly and quietly with respect to the pod. In one embodiment, the ball bearings 350, 352 are made from a rubber or plastic. This prevents a metal to metal contact, which offers a smoother feel. However, the pod 234 could also made from a number of other materials known in the industry, for example, metals, wood, carbon fiber, Teflon, nylon, or other suitable plastic material, without defeating the spirit of the invention.

In one embodiment, the pod 324 also includes a pair of grooves 354, 356 around its exterior. A pair of o-rings 358, 360 are seated in the grooves 354, 356. The o-rings 358, 360 contact the scope casing 178 and allow the scope casing to move smoothly and quietly laterally and be rotated with respect to the pod.

In one embodiment the stem 176 is made from ground stainless steel for strength and to provide smooth movement within the boss 180. However, other materials could be used for the stem 176, e.g. aluminum, without defeating the spirit of the invention. The scope head 92 and the stem 176 could also be attached in a number of known means for attaching such components, e.g. integrally forming, welding, threading, gluing, etc., the use of which would not defeat the spirit of the invention.

Figure 10A:
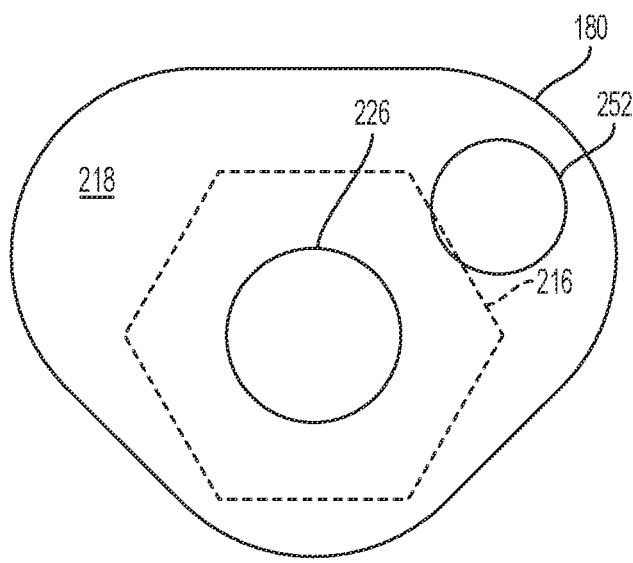
FIG. 10A is a side elevation view of the boss removed from the sight apparatus of FIG. 1.
Figures 10B, 10C, 10D:
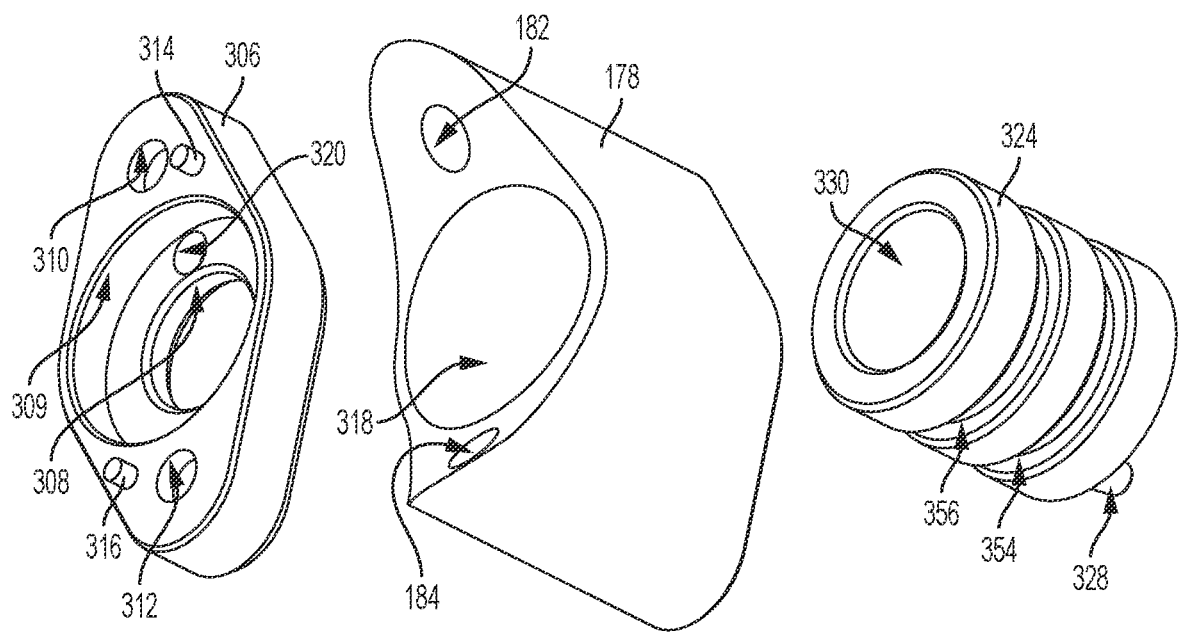
FIG. 10B is a rear perspective view of the scope cap removed from the sight apparatus of FIG. 1.
FIG. 10C is a rear perspective view of the scope casing removed from the sight apparatus of FIG. 1.
FIG. 10D is a rear perspective view of the pod removed from the sight apparatus of FIG. 1.

The end of the stem 176 opposite the scope head 92 has an end hole 212. A worm gear 214 is threaded into the end hole 212 of the stem 176. The stem 176 and worm gear 214 fit within a boss bore 216 (seen in FIG. 10A) in a windage arm or boss 180 to attach the scope head 92 to the boss. The boss bore 216 terminates in a wall 218.

The boss bore 216 and/or stem 176 may be shaped in a cross section other than a circle to prevent rotation of the stem with respect to the boss. In one embodiment seen in FIG. 10A, the cross section of the boss bore and stem are hexagonal. As seen in FIG. 2A, the stem cavity 332 may also have a cross section that matches the cross section of the stem 176 to help resist rotation of the stem.

Again, referring to FIG. 2A, a collar 220 is affixed to the worm gear 214 to divide the worm gear into two parts, a first part 222 that is engaged with the stem 176 and a second part 224 opposite the first part. When the stem 176 and worm gear 214 are inserted into the boss bore 216, the collar 220 abuts the wall 218 of the boss 180 to hold the stem and/or worm gear to the boss and prevent the stem and/or worm gear from being further inserted into the boss bore 216. The second part 224 of the worm gear 214 extends out of the boss bore 216 through a smaller wall hole 226 in the wall 218 of the boss 180. A collar washer 228, such as a silicone or plastic washer, may be located between the wall 218 and the collar 220 to decrease the friction there-between when the worm gear 214 and, thereby, the collar is rotated.

A micro-knob 230 is attached to the second portion 224 of the worm gear 214 to rotatably attach the micro-knob to the boss 180, such that the micro-knob may be turned to laterally move the scope head 92 and sight pin 90. As such, the scope head 92 and sight pin 90 are engaged with the boss 180 and the micro-knob 230. The micro-knob 230 in FIG. 11 includes a center hole 232 sized to receive the second part 224 of the worm gear 214 extending through the wall hole 226 in the wall 218 of the boss 180. An edge hole 234 in the curved surface of the micro-knob 230 allows an edge fastener 236 to be threaded into the edge hole to contact the second part 224 of the worm gear 214 and attach the micro-knob to the worm gear. The micro-knob 230 and the stem 176 could also be attached in a number of known means for attaching such components, e.g. integrally forming, welding, threading, gluing, etc., the use of which would not defeat the spirit of the invention.

When the micro-knob 230 is rotated in a first direction, the worm gear 214 is rotated in a first direction. Because the collar 220, on one side of the wall 218 of the boss 180, and the micro-knob 230 on the other side of the wall, hold the worm gear in place with respect to the boss, rotating the worm gear, e.g. by micro-knob 230, does not translate into movement of the worm gear in lateral direction. In one embodiment, the micro-knob 230 is larger than the wall hole 226 such that when the boss 180 is moved in a first lateral direction, the micro-knob will contact the wall 218 and the boss 180 will be prevented from being moved further in the first lateral direction. Because the stem cannot rotate with the worm gear 214, the first part 222 of the worm gear 214 is threaded further into the end hole 212 in the stem 176 when the micro-knob 230 is rotated in a first direction and unthreaded further out of the end hole in the stem when the knob is rotated in a second direction. When the first part 222 of the worm gear 214 is threaded into the end hole 212 in the stem 176, the stem moves laterally further into the boss 180 and the scope head 92 moves in a first lateral direction, e.g.

toward the boss. When the first part 222 of the worm gear 214 is unthreaded out of the end hole 212 in the stem 176, the stem moves laterally further out of the boss 180 and the scope head 92 moves in a second lateral direction, e.g. away from the boss. Movement of the stem 176 within the boss 180 does not change the position of the boss with respect to the block 248.

Figure 11:
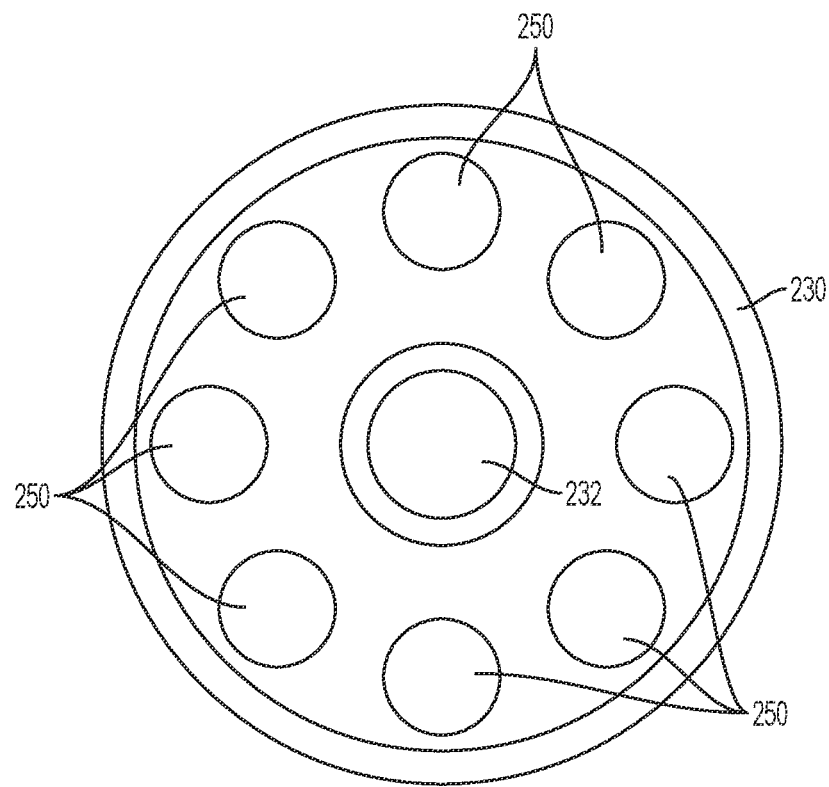
FIG. 11 is a side elevation view of the micro-knob removed from the sight apparatus of FIG. 1.

The micro-knob 230 may also have a series of dents 250 in the flat surface of the micro-knob (as seen in FIG. 11) facing the wall 218 on the first end of the boss 180. The wall 218 of the boss 180 seen in one embodiment shown in FIG. 2A, may have a boss blind bore 252 in which a boss spring 254 and a boss ball bearing 256 are positioned, such that the boss spring urges the boss ball bearing at least partially out of the boss blind bore. When the micro-knob 230 is rotated, the boss ball beating 256 will move into and out of the dents 250 in the micro-knob to provide an audible sound, e.g. a click, and/or tactile feedback. The feedback provides a user with a reference as to how much movement or translation is being applied to the scope head 92 and/or provide a known amount of translation to get to desired scope head 92 position, e.g. five clicks.

The boss 180 may also have a gap 258 formed therein such that a portion of the stem 176, the marker 260 (as seen in FIG. 7), can be seen there-through. In the embodiment seen in FIG. 7, the boss 180 includes markings 262 by or proximate to the gap 258 and the stem 176 includes a marker 260 such that the amount of lateral movement of the stem and, thereby, the scope head 92 with respect to the boss, can be seen visually or identified.

The stem 176 may include a retention hole 362. A stem fastener 364 is partially located in the hole 362 such that when the stem 176 is in the boss 180, the stem fastener is partially in the gap 258. When the first part 222 of the worm gear 214 is unthreaded out of the end hole 212 in the stem 176 and the stem moves laterally further out of the boss 180, the stem fastener 364 moves toward the end of the gap 258. The stem fastener 364 will eventually contact the portion of the boss 180 forming the end of the gap to prevent the worm gear 214 from being rotated out of the stem 176.

The boss 180 is attached to the slide member 94 by a clamp, block or windage bracket 248. In the embodiment seen in FIG. 2A, the block 248 has a I-member 264 that is configured, e.g. shaped, to be received in a channel 266 formed in the slide member 94 to attach the bracket to the slide member. In the embodiment illustrated, the T-member 264 is T shaped as is the channel 266, however, there are many known shapes for nuts in cooperation with a channel that could be used without defeating the spirit of the invention. Further, the T-member 264 could alternatively be multiple T nuts. The T-member also has holes 263 to permit fasteners 272 to extend through as will be explained further below. The T-member could also have one or more balls 265, such as made from a compressible material, e.g. acetal homopolymer resin, seated in one or more divots 267. The balls 265 extend out of the divots 267 such that when the block 248 and T-member 264 are attached to the slide member 94, the balls 265 are slightly compressed to remove play and allow the T-member to slide more easily in the channel 266. The balls could also add a dampening effect and prevent rattling, e.g. when an arrow is shot.

The block 248 includes a top block hole 268 and a bottom block hole 270. A pair of block fasteners 272 extend through the top block hole 268 and a bottom block hole 270 and through the holes 263 in the T-member 264. The T-member can be inserted into the channel 266, e.g. from the top or bottom. When the scope head 92 is in the desired position, the block fasteners 272 are tightened to hold the block 248 in place with respect to the slide member 94 by clamping a portion of the slide member between the T-member 264 and block.

Figure 5:
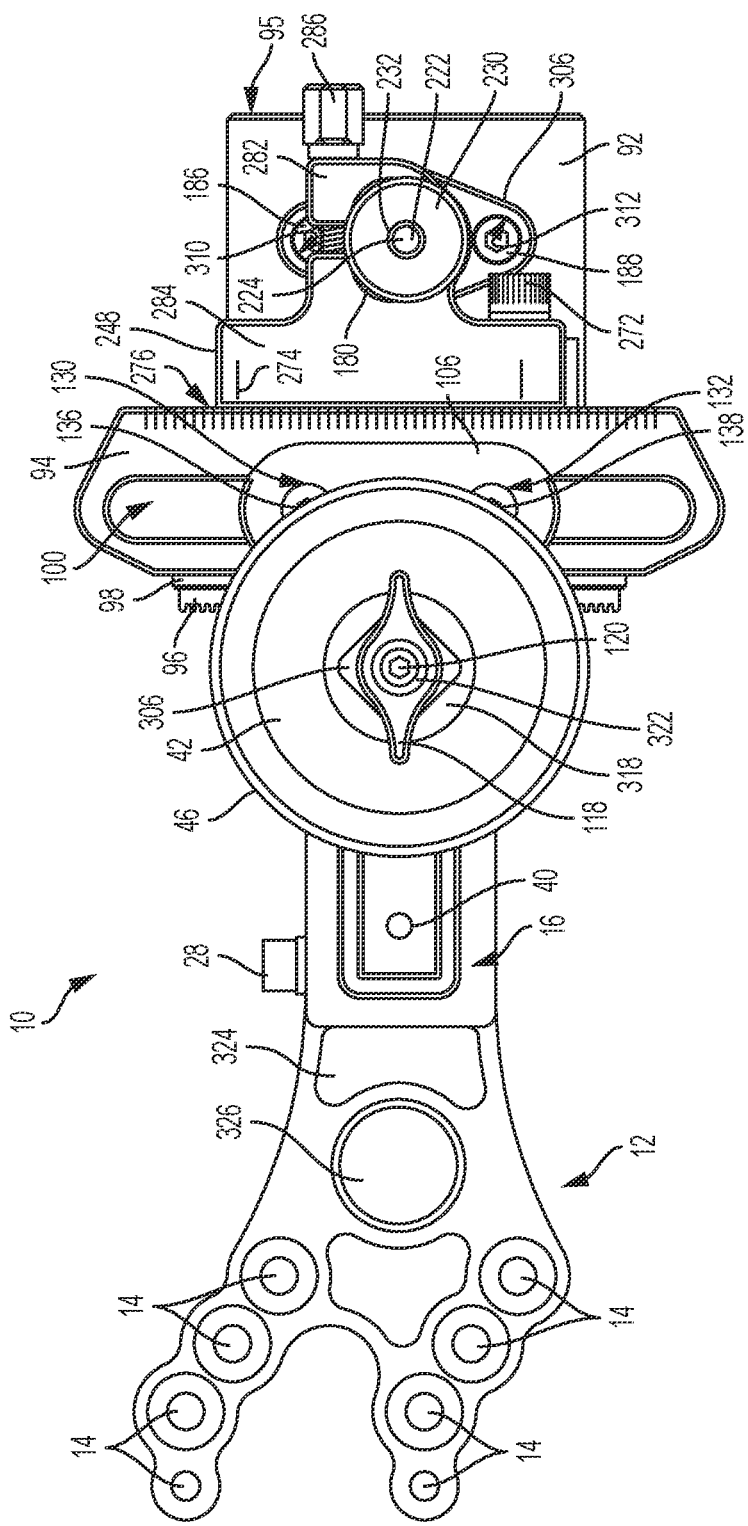
FIG. 5 is side elevation view of the sight apparatus of FIG. 1.
Figure 6:
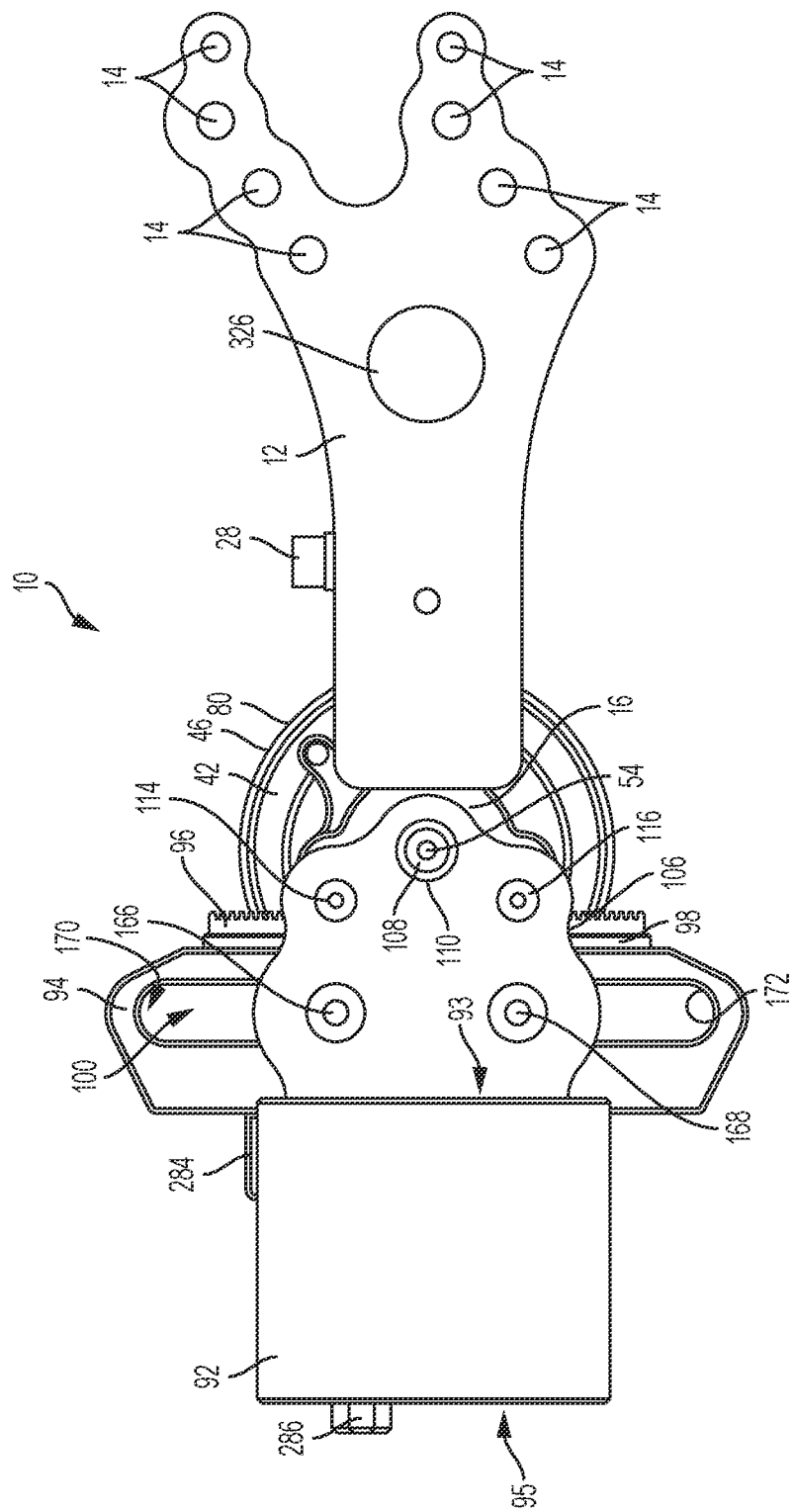
FIG. 6 is another side elevation view of the sight apparatus of FIG. 1.

Having a portion of the block 248 engage a channel 266 of the slide member 94 allows the block and, thereby, the scope head 92 almost infinite adjustment and placement vertically along the slide member. As seen in FIG. 5, the block 248 may also include a pointer 274 and the slide member 94 a scale 276 such that the desired location for the placement of the block along the channel 266 can be identified.

The block 248 also includes an opening 278, U-shaped in the embodiment show in FIG. 2A, formed therein sized and shaped to slidably receive and selectively hold the boss 180. A leg hole 280 extends through the tops of a pair of legs 282, 284 which form the opening 278. A fastener, such as a lock or lock knob 286, is engaged with, e.g. threaded through, front leg or first part 282 and into the back leg or second part 284 of the block 248. When the lock knob 286 is tight or locked, e.g. further threading after the head or knob of the lock knob contacts the front leg 282, the front leg will be bent towards the back leg 284 to clamp and/or lock the boss 180 into position and prevent the boss from moving with respect to the block 248. The boss 180 can also be designed such that the walls of the boss and/or size of the gap 258 allow the clamping action from the front leg 282 and back leg 284 to transfer to the front and back walls of the boss to clamp and hold the stem 176.

Figure 12:
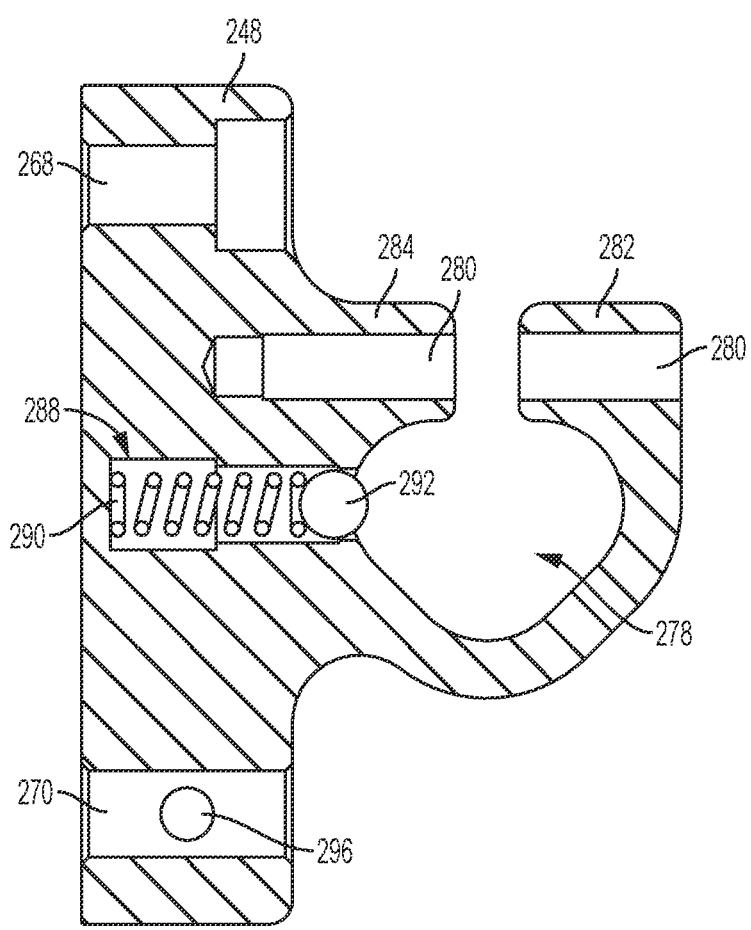
FIG. 12 is a front cross-sectional view of the sight apparatus taken along the lines 12-12 in FIG. 7.

A portion of the block 248, in the embodiment shown in FIG. 12 the back leg 284, may also include a block bore 288 sized to receive a block spring 290 and a block ball bearing 292. The block spring 290 is positioned in the bore 288 to urge the block ball bearing 292 at least partially into the opening 278 in which boss 180 is positioned. In the embodiment shown in FIG. 2A, the front face of the boss 180 also includes a series of indentations 294. As the boss 180 is moved within the block 248, and, thereby, the indentations 294, the boss will make a clicking sound and/or feel as the block spring 290 pushes or urges the block ball bearing 292 into and/or out of one of the indentations. These clicks may be correlated to units of displacements, e.g. one click equals sixes inches at twenty yards and/or so many divots. In one embodiment one rotation of the micro-knob 230 moves the scope head 92 a first distance which is less than movement of the boss from one indentation to another or the second distance. In another embodiment, eight rotations of the micro-knob 230 results in movement of the scope head 92 about the same as movement of the boss from one indentation to another. The ball bearing 292 being within one of the series of indentations 294 also helps selectively hold the boss 180 in position with respect to the block 248 such that the micro-knob 230 can be rotated to move the scope head 92.

The sight pin 90, via the scope head 92, can be adjusted or moved laterally on a larger scale by loosening the lock knob 286 which permits the boss 180 to be slid within the opening 278 of the block 248. Moving the boss 180 within the block 248 does not change the position of the stem 176 within the bore 216 in the boss. When the sight pin 90 is generally in the desired position, e.g. when first setting up the sight 10, the lock knob 286 can be tightened to hold the boss 180 in position. The micro-knob 230 can be used to adjust or move the sight pin laterally on a smaller scale by turning the micro-knob. This allows the scope head 92 to be adjusted in the large increments quicker than with just a micro-drive and in small increments with more precision than with just a macro-drive.

One of the top block hole 268 and/or bottom block hole 270 can be a slotted hole, seen as the bottom block hole in the embodiment illustrated in FIG. 2A. When the block fastener 272 for the slotted hole 270 is loosened, the bottom of the block 248 can be rotated about a pivot or axis through the block fastener 272 in the top block hole 268 in the block, sometimes called the second axis. This rotation allows the scope head 92 to be adjusted and leveled.

Figure 13:
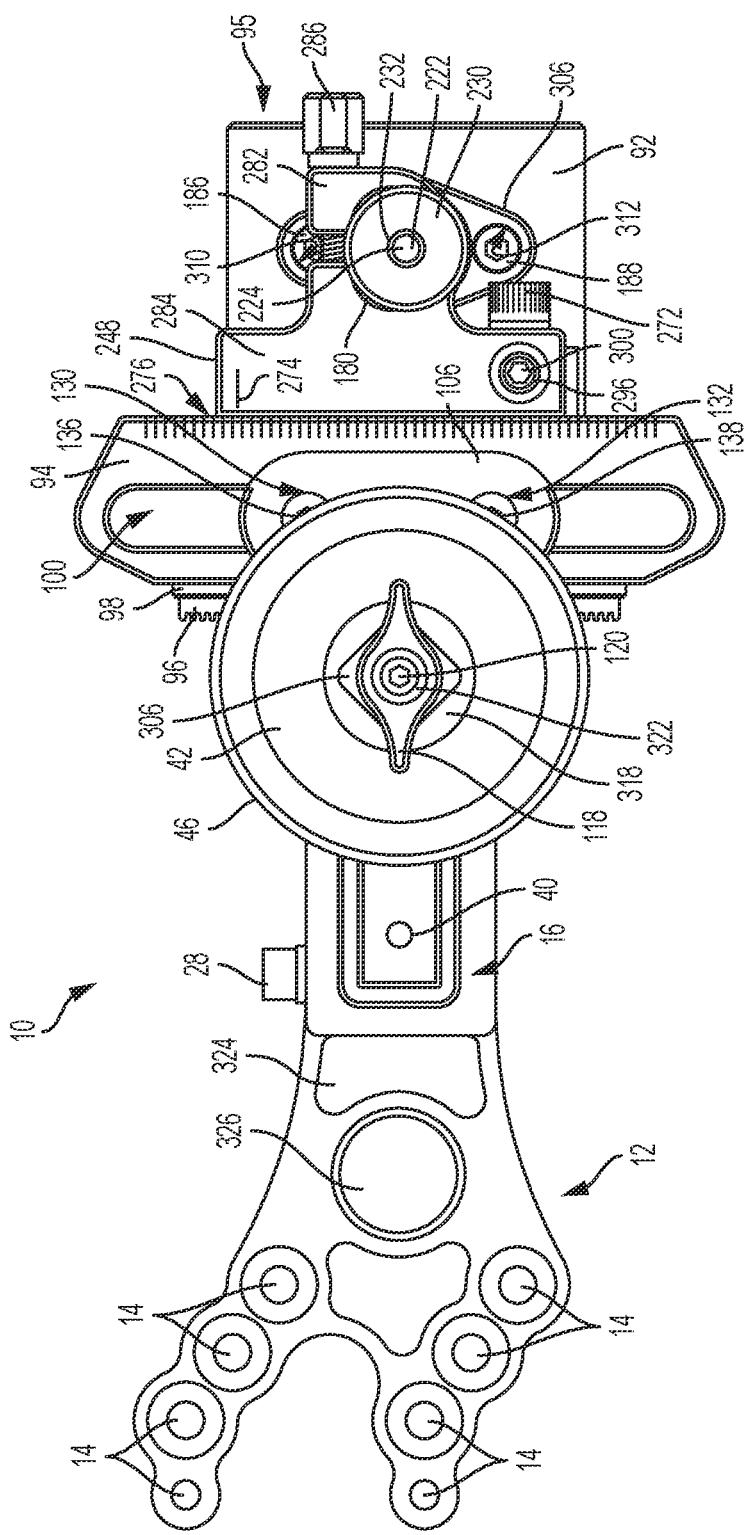
FIG. 13 is a side elevation view of an alternative embodiment of a sight apparatus.

In an alternative embodiment seen in FIG. 13, to assist in allowing very small adjustments in the second axis, a side block hole 296 is located in the block 248 on one or more sides of the slotted hole 270. Threaded inserts, e.g. a threaded insert on the scope head or left side (not shown) and a threaded insert on the dial or right side 300, are engaged in the side block holes 296. To adjust the scope head 92, for example, the right insert 300 can be loosened and the left insert threaded into the left side block hole 296 until it contacts the bottom block fastener 272. Further rotation of the left insert into the left side block hole 296, e.g. clockwise, will cause the block 248, and thereby the scope head 92, to rotate counterclockwise, when looking through the scope head, about the top block fastener 272. When the desired position of the scope head 92 is reached, the block fasteners 272 can be tightened down and the left insert and right insert 300 put into contact with the bottom block fastener 272 to secure the scope head.

In some embodiments, it is desirable that the mounting of the wheel 42 to the peg 54 must be certain and wear-proof so that as the wheel is rotated a certain amount, the sight pin 90 is moved by a precise, predictable amount. One embodiment for accomplishing the desired level of certainty in the mounting is shown in FIG. 2A, and shown in more detail in FIG. 9. After the wheel 42 has been placed on the peg 54, a washer 304 is slid onto the peg 54 and then a first nut 306 is screwed onto the peg, such as a square nut, and tightened so that the washer contacts the wheel. The square nut 306 may have a break or slit 308 from a first side to the center threaded opening so as to form a first leg 310 and second leg 312. An opening or bore 314 for an inset screw 316 is formed on the second side of the square nut or first leg 310 and extends through the first leg, past the break 308 and into the second leg 312, such that when the square nut is threaded onto the peg 54 and in its final position, the inset screw 316 may be threaded into the opening 314 on the first side of the square nut and tightened thereby pinching the legs 310, 312 together around the threaded post.

The wheel 42 will still be rotatable, with a certain amount of friction, when the square nut 306 is secured to the peg 54. A thrust washer 318, having a square opening that generally matches the size and shape of the square nut 306 but with a greater thickness, is then applied over the square nut, and a second nut or wing nut 118 is then threaded onto the peg 54. A rubber O-ring 320 is seated in a groove around the opening in the wing nut 118. As referred to above, screw 120 with a washer 322 is threaded into the threaded opening 122 at the end of the peg 54 to maintain the wing nut 118 on the post. When the wing nut 118 is tightened, moved or rotated to a first position, the thrust washer 318 will be pushed towards the wheel 42 and the friction applied thereby will be increased to the extent that the wheel will be prevented from rotating. When the wing nut 118 is loosened, moved or rotated to a second position, the thrust washer 318 will be released from the wheel 42 and the friction applied thereby will be decreased to the extent that the wheel can be rotated.

In order to adjust the rotational position of the wheel 42 (and thereby change the position of the slide member 94 and move or adjust the sight pin 90 with respect to the adjustable member 16), the user would loosen the wing nut 118, rotate the wheel 42 as desired, and re-tighten the wing nut 118. The use of the thrust washer 318 around the square nut 306 focuses the small amount of contact friction from turning the wing nut 118 on the thrust washer instead of the square nut and thus prevents such friction from loosening the square nut. This allows the sight apparatus to be more accurate by reducing wiggle or play from the square nut 306 and thus the wheel 42.

Figure 8:
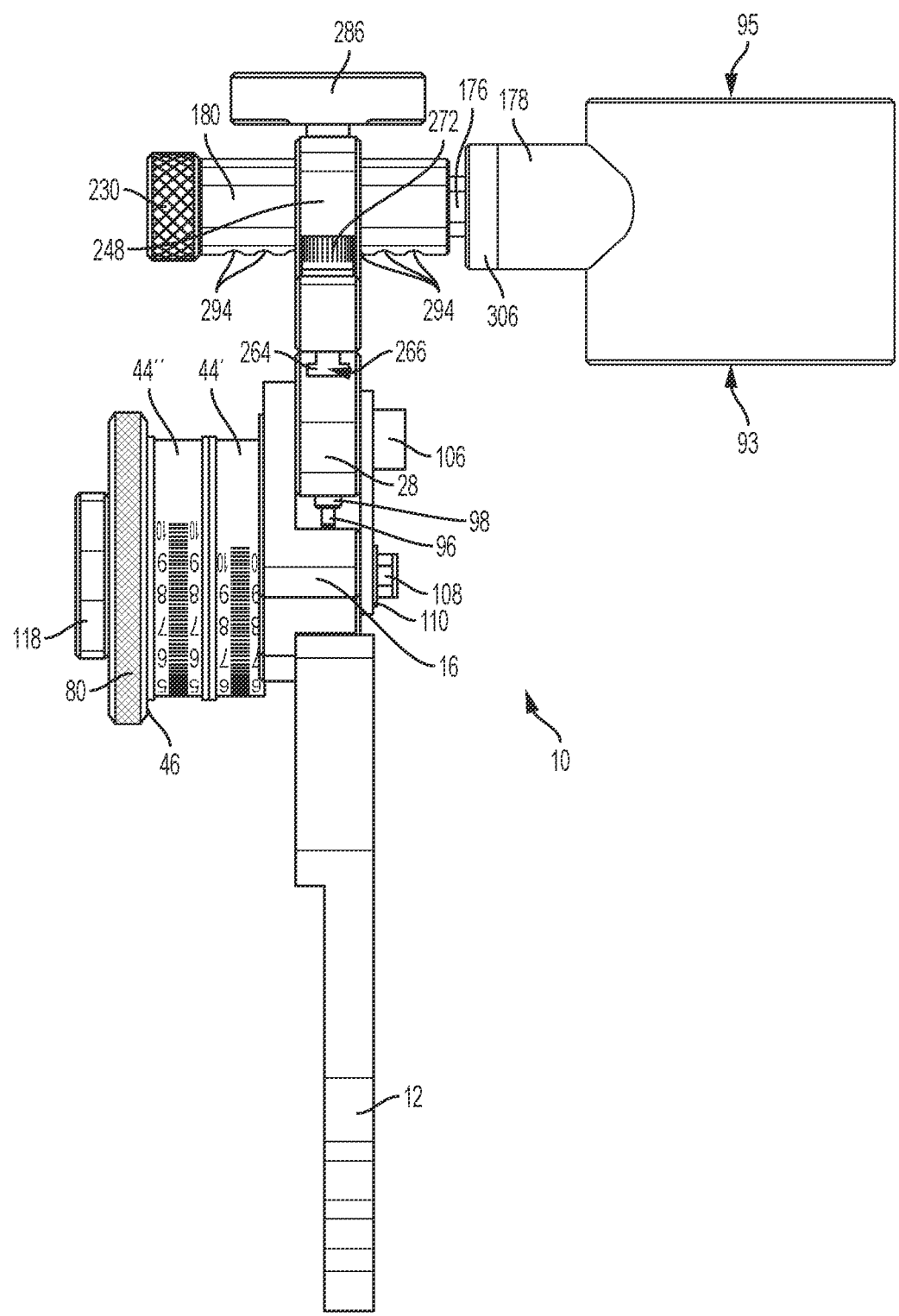
FIG. 8 is bottom plan view of the sight apparatus of FIG. 1.

In an alternate embodiment, as disclosed and described in FIG. 8 of U.S. Pat. No. 9,453,709, a square nut could be threaded onto the peg 54 and a thrust washer with a square opening sized so as to just fit over the square nut placed over the square nut. Once tightened, the square nut is set in place by means of an inset screw that engages the peg 54. Thereafter, a matching thrust washer, again with a square opening sized so as to just fit over the square nut, is applied over the square nut. Finally, the wing nut 118 is threaded onto the peg 54 and a screw 120 can be threaded into the opening 122 at the end of the peg or a nut threaded onto the peg to hold the washers, nuts and wheel on the peg.

In another embodiment seen in FIG. 2A of U.S. Pat. No. 9,453,709, a hex nut, mounted within a thrust washer with a six-sided opening, is threaded onto the peg 54 and tightened so that the thrust washer contacts the wheel 42. A thrust washer, having a six-sided opening that generally matches in size the hex nut, is then applied over the hex nut, and a wing nut 118 is then threaded onto the peg 54. A screw or nut can then be used to hold the washers, nuts and wheel on the peg.

As indicated, the tightening of the square nut 306 or hex nut is intended to hold the wheel generally in place, but permit rotation. The application and tightening of the wing nut 118 will prevent rotation of the wheel 42, once the sight apparatus 10 has been set up.

In order to reduce the weight of the sight apparatus 10, holes and/or cavities 324 can be formed in almost any of the parts or members. For example, in the embodiment shown in FIG. 2A, cavities are formed in the adjustment member 16. Holes and/or cavities can also be formed to hold other accessories as well. For example, the mounting member 12 has a hole 326 sized and shaped to hold a damper to help reduce vibrations and noise and increase accuracy.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein. For example, in one embodiment many components are made from aluminum, however, other suitable materials known in the art could be used without defeating the spirit of the invention. Further, although certain advantages of different embodiments and disadvantages of certain prior art are described, no single claim must realize every or any benefit or overcome every or any disadvantage.

What is claimed is:

1. A sight comprising:
   a housing;
   a stem connected to the housing;

a scope head rotatably attached to the stem, the scope head having a first end and a second end;
a first sight pin attached to the scope head, the first sight pin facing the first end; and
a second sight pin attached to the scope head, the second sight pin facing the second end;
wherein the scope head is configured such that it may be rotated between a first position in which the first end faces a user of the sight and a second position in which the second end faces the user.

2. The sight of claim 1, wherein the first sight pin is configured to be used for a first facto when the scope head is in the first position; and the second sight pin is configured to be used for a second factor when the scope head is in the second position.

3. The sight of claim 2, wherein the first factor is a first distance and the second factor is a second distance and wherein the second distance is greater than the first distance.

4. The sight of claim 1, further comprising a scope mount attached to the scope head and a resilient member at least partially within a pocket formed in the scope mount;
wherein the resilient member is configured to urge the scope head away from the stem;
wherein when the resilient member is in a compressed position, the scope head is rotatable between the first position and the second position and when the resilient member is in an decompressed position, the scope head is not rotatable between the first position and the second position.

5. The sight of claim 4, wherein the resilient member is in a compressed position when the scope head is moved towards the stem.

6. The sight of claim 5, further comprising a pod located in the pocket;
wherein the pod has a cavity formed therein;
wherein the resilient member is located within at least partially within the cavity; and
wherein the resilient member urges the pod away from the scope head.

7. The sight of claim 6, wherein the resilient member urges the pod into contact with the scope mount.

8. The sight of claim 7, wherein the scope mount includes a first indentation formed therein;
wherein the pod includes a first tab;
wherein when the resilient member is in the decompressed position, the first tab is at least partially within the first indentation; and
wherein when the resilient member is in the compressed position, the first tab is not within the first indentation.

9. The sight of claim 8, wherein the scope mount includes a second indentation formed therein;
wherein the pod includes a second tab;
wherein when the resilient member is in the decompressed position, the second tab is at least partially within one of the second indentation and first indentation and the first tab is at least partially within another one of the second indentation and first indentation; and
wherein when the resilient member is in the compressed position, the second tab is not within one of the second indentation and first indentation and the first tab is not within one of the second indentation and first indentation.

10. The sight of claim 9, wherein the scope head is configured such that when the scope head in the first position the first tab is in the first indentation and the second tab is in the second indentation and when the scope head is in the second position the first tab is in the second indentation and the second tab is in the first indentation.

11. The sight of claim 10, further comprising a stem fastener, the stem fastener extends through a pod bore formed in the pod and is located at least partially within a first stem bore formed in the stem to secure the pod to the stem.

12. The sight of claim 10, wherein at least part of the stem extends through a bore formed in the scope mount; and wherein an end of the stem is located in a stem cavity formed with in the end of the stem.

13. The sight of claim 8, further comprising:
a wheel having a first set of indicia, the wheel rotatably connected to the housing;
an indicator attached to the housing, the indicator identifies a first indicia of the first set of indicia;
a pinion gear connected to the wheel such that when the wheel is rotated the pinion gear is rotated; and
a linear gear bar engaged with the pinion gear, the linear gear bar connected to the stem;
wherein the wheel is configured such that rotation of the wheel adjusts the scope head and changes the first indicia identified by the indicator.

14. The sight of claim 13, wherein the wheel has a second set of indicia;
wherein the indicator identifies a second indicia of the second set of indicia;
wherein the wheel is configured such that rotation of the wheel changes the second indicia identified by the indicator; and
wherein changing the first indicia adjusts the first sight pin for a first factor and changing the second indicia adjusts the second sight pin for a second factor.

15. The sight of claim 14 wherein the first factor is selected from a group consisting of altitude, humidity, temperature, wind, atmospheric pressure, arrow velocity, draw weight, trajectory, arrow weight, arrow size, and a set of distance.

16. The sight of claim 15 wherein the second factor is selected from a group consisting of altitude, humidity, temperature, wind, atmospheric pressure, arrow velocity, draw weight, trajectory, arrow weight, arrow size, and a set of distance; and wherein the first factor is different from the second factor.

17. The sight of claim 15 wherein the second factor is selected from a group consisting of second altitude, second humidity, second temperature, second wind, second atmospheric pressure, second arrow velocity, second draw weight, second trajectory, second arrow weight, second arrow size, and a second set of distance; and wherein the first factor is different from the second factor.

18. A method of using a sight comprising:
positioning a first sight pin in an aiming ring in front of a target;
rotating a dial to adjust the first sight pin until a fired projectile hits the target;
rotating the aiming ring generally half of one full rotation such that the first sight pin is removed from a line of sight to a second target;
positioning a second sight pin in front of the second target; and
rotating the dial to adjust the second sight pin until the fired projectile hits the second target.

19. A sight apparatus for a bow comprising:
a frame configured to mount the sight apparatus to the bow,
a dial rotatably connected to the frame;

a sight housing having a first face and a second face; the sight housing engaged with the dial such that when the dial rotates in a first direction the sight housing is raised and when the dial is rotated in a second direction the sight housing is lowered;

a first sight pin located in the sight housing, the first sight pin facing the first face; and a second sight pin located in the sight housing, the second sight pin facing the second face;

wherein the sight housing is configured to be rotated between a first position and a second position; and wherein the sight housing is configured such that the first face is facing a user of the sight apparatus when the sight housing is in the first position and the second face is facing the user of the sight apparatus when the sight housing is in the second position.

20. The sight apparatus of claim 19, further comprising:
a first set of markings attached to the dial;
a second set of markings attached to the dial; and
a marker attached to the frame, the marker marks a first marking of the first set of markings and a second marking of the second set of markings;
wherein when the dial is rotated, the first set of markings and the second set of markings are rotated and the first marking of the first set of markings and the second marking of the second set of markings marked by the marker are changed.

21. The sight apparatus of claim 20 further comprising a first spool selectively attached to the dial and a second spool selectively attached to the dial and wherein the first set of markings are located on the first spool and the second set of markings are located on the second spool.

22. The sight apparatus of claim 19, further comprising:
a boss, wherein a portion of the boss is positioned within an opening formed in the frame and selectively held by the frame; and
a knob rotatably attached to a first end of the boss;
wherein the sight housing is engaged with the dial by being connected to the boss;
wherein movement of the boss within the frame moves the sight housing laterally; and
wherein rotation of the knob moves the sight housing laterally.

23. The sight apparatus of claim 22 further comprising a lock engaged with the frame such that when the lock is tightened, the frame clamps the boss to hold the boss in position with respect to the frame.

24. The sight apparatus of claim 23, wherein the frame is configured such that when the lock is tightened and the knob is rotated in a first direction, the sight housing is moved in a first direction and when the knob is rotated in a second direction, the sight housing is moved in a second direction.

25. The sight apparatus of claim 24, wherein the knob is configured to micro-adjust the sight housing laterally and wherein the boss is configured to macro-adjust the sight housing laterally.

26. The sight apparatus of claim 22 wherein the opening is a U-shaped opening and a lock is engaged with a pair of legs of the frame forming the opening such that when the lock is tightened, the pair of legs clamp the boss to hold the boss in position with respect to the frame.

27. The sight apparatus of claim 22 further comprising:
a sight mount having a stem, wherein the sight housing is attached to the sight mount;
wherein the knob is in threading engagement with the stem such that when the knob is rotated in a first direction the sight housing moves in a first lateral direction; and when the knob is rotated in a second direction the sight housing moves in a second lateral direction.

28. The sight apparatus of claim 27 wherein the stem is located within a bore formed in the boss.

29. The sight apparatus of claim 28 wherein a threaded portion of the knob extends through a hole in a side of the boss and into the bore and wherein a collar is attached to the threaded portion of the knob within the bore such that when the knob is rotated, the threaded portion does not move in a lateral direction with respect to the boss.

30. The sight apparatus of claim 29 wherein when the knob is rotated in the first direction, the threaded portion is at least partially threaded into an end of the stem to move the sight housing in the first lateral direction and when the knob is rotated in the second direction, the threaded portion is at least partially threaded out of the end of the stem to move the sight housing in the second lateral direction.

\* \* \* \* \*

UNITED STATES PATENT AND TRADEMARK OFFICE
CERTIFICATE OF CORRECTION

| | |
|---|---|
| PATENT NO. | : 11,519,694 B1 |
| APPLICATION NO. | : 17/812912 |
| DATED | : December 6, 2022 |
| INVENTOR(S) | : Brian H. Hamm et al. |

It is certified that error appears in the above-identified patent and that said Letters Patent is hereby corrected as shown below:

In the Claims

Column 17, Line 12:
--factor-- should replace "facto"

Signed and Sealed this
Thirty-first Day of January, 2023

Katherine Kelly Vidal
*Director of the United States Patent and Trademark Office*